US011885163B2

(12) United States Patent
Yoo et al.

(10) Patent No.: US 11,885,163 B2
(45) Date of Patent: Jan. 30, 2024

(54) FITTING FRAME HAVING IMPROVED PREFABRICATED RAILS

(71) Applicant: ALPHAQ INC., Gyeonggi-do (KR)

(72) Inventors: Jung Sik Yoo, Incheon (KR); Hae Sook Yoo, Gyeonggi-do (KR)

( * ) Notice: Subject to any disclaimer, the term of this patent is extended or adjusted under 35 U.S.C. 154(b) by 335 days.

(21) Appl. No.: 17/431,922

(22) PCT Filed: Feb. 27, 2020

(86) PCT No.: PCT/KR2020/002817
§ 371 (c)(1),
(2) Date: Aug. 18, 2021

(87) PCT Pub. No.: WO2020/197110
PCT Pub. Date: Oct. 1, 2020

(65) Prior Publication Data

US 2022/0145682 A1 May 12, 2022

(30) Foreign Application Priority Data

Mar. 26, 2019 (KR) ........................ 10-2019-0034691

(51) Int. Cl.
*E06B 3/46* (2006.01)
*E05D 15/06* (2006.01)
*E06B 1/52* (2006.01)
*E06B 3/00* (2006.01)

(52) U.S. Cl.
CPC ............ *E05D 15/0665* (2013.01); *E06B 1/52* (2013.01); *E06B 3/4636* (2013.01); *E05Y 2201/684* (2013.01); *E05Y 2201/688* (2013.01); *E05Y 2600/45* (2013.01); *E05Y 2900/132* (2013.01)

(58) Field of Classification Search
CPC ..................................................... E06B 3/4636
USPC ........................................................ 52/204.1
See application file for complete search history.

(56) References Cited

U.S. PATENT DOCUMENTS 3,085,298 A * 4/1963 Metzger ................ E05D 15/066 49/425
3,407,537 A * 10/1968 Urbanick .............. E06B 3/4636 49/490.1
4,084,289 A * 4/1978 Naimo ................ E05D 15/0686 16/87 R
4,192,100 A * 3/1980 Klema .................. E06B 3/4636 49/404
4,513,555 A * 4/1985 Johnson ................ E06B 3/4636 403/231

(Continued)

FOREIGN PATENT DOCUMENTS

KR 100817228 B1 3/2008
KR 101536922 7/2015

*Primary Examiner* — Brian D Mattei
*Assistant Examiner* — Joseph J. Sadlon
(74) *Attorney, Agent, or Firm* — IPLA P.A.

(57) ABSTRACT

A fitting frame having improved prefabricated rails, the fitting frame being implemented so as providable on an interior wall surface and the like, and includes: an upper frame body and a lower frame body which have facing surfaces respectively facing the upper end portion and the lower end portion of a door frame, and which are extrusion-molded in a longitudinal direction; and rail assemblies which are respectively fastened to the facing surfaces of the upper frame body and the lower frame body, and which guide the door frame so that same is mounted and slides thereon.

1 Claim, 15 Drawing Sheets

(56) References Cited

U.S. PATENT DOCUMENTS

| | | | | |
|---|---|---|---|---|
| 5,139,111 | A * | 8/1992 | Baumann | E05D 15/0626<br>52/208 |
| 5,873,204 | A * | 2/1999 | Gehn | B62B 3/004<br>49/503 |
| 6,330,763 | B1 * | 12/2001 | Kern | E05D 15/1021<br>49/226 |
| 6,345,477 | B1 * | 2/2002 | Kepler | E06B 1/70<br>49/468 |
| 7,730,677 | B2 * | 6/2010 | Hansen | E01F 8/0017<br>52/204.593 |
| 8,074,699 | B2 * | 12/2011 | Jones | E06B 3/4636<br>160/40 |
| 9,453,360 | B2 * | 9/2016 | Kim | E05D 15/0665 |
| 9,458,661 | B2 * | 10/2016 | Farrell | E05F 15/00 |
| 9,708,843 | B2 * | 7/2017 | Geysels | E04F 21/0023 |
| 9,719,282 | B2 * | 8/2017 | Bellei | E05D 13/10 |
| 9,863,178 | B2 * | 1/2018 | Wang | E05F 5/027 |
| 9,945,117 | B2 * | 4/2018 | Cobb | E05D 15/26 |
| 10,392,844 | B2 * | 8/2019 | Kreyenborg | E05D 15/063 |
| 10,508,441 | B2 * | 12/2019 | Kopish | E04F 21/1877 |
| 10,731,412 | B2 * | 8/2020 | Roberts | E06B 3/4636 |
| 10,781,607 | B2 * | 9/2020 | Rogel | B64C 1/1438 |
| 10,900,263 | B2 * | 1/2021 | Laliberte | E05B 65/0811 |
| 11,365,582 | B1 * | 6/2022 | Salvoni | E06B 1/52 |
| 2003/0201074 | A1 * | 10/2003 | Schnoor | E06B 3/4636<br>160/90 |
| 2016/0177565 | A1 * | 6/2016 | Aykas | E06B 3/4636<br>52/64 |

* cited by examiner

FITTING FRAME HAVING IMPROVED PREFABRICATED RAILS

BACKGROUND

The present invention relates to a fitting frame having improved prefabricated rails, and more particularly, to a fitting frame having improved prefabricated rails that is capable of being installed on an interior wall surface and the like.

Generally, various fittings are installed on apartment or single houses, offices, schools, public buildings and the like for the purposes of lighting, ventilation, entrance and exit, and space partitioning.

Such fittings have a wide range of sizes ranging from small doors used as windows to large windows and doors installed on the whole surface of a wall, and they are divided into fittings configured to have a single or two doors coupled to a frame with a single track rail and slide type fittings configured to have three or four doors coupled to a frame with double pane windows, that is, four rails.

Further, the fittings for mounting the doors and performing sliding to open and close the doors are made of various materials. In the past, the fittings made of wood are used, but as the fittings made of wood have relatively low durability, recently, the fittings, which are made by extruding a metal or synthetic resin, have been generally used.

As mentioned above, the fittings have rails adapted to gently move the doors thereon, and the fittings made of a metal or synthetic resin, which are widely used recently, are molded integrally with the rails in the process of being extruded.

When an extrusion mold for molding the fittings is made, that is, the rails are molded to protrude from the fittings, together with the fittings, and accordingly, the single track rail or multi-track rails may protrude integrally from the insides of the fittings made of the metal or synthetic resin, thereby performing door sliding gently.

However, the background art as mentioned above is held by the inventor to derive the present invention or is technology information acquired in the process of deriving the present invention, and accordingly, it is not necessary that the background art is the technology known to the general public before filing.

(Patent document 1) Korean Utility Model application laid-open No. 20-2012-0001699

(Patent document 2) Korean Utility Model registration No. 20-0186912

SUMMARY OF THE INVENTION

Accordingly, it is an object of the present invention to provide a fitting frame having improved prefabricated rails that is capable of allowing frame bodies having insertion recesses formed on top surfaces in a longitudinal direction thereof to be fastened to rail coupling bodies separately provided.

The technical problems to be achieved through the present invention are not limited as mentioned above, and other technical problems not mentioned herein will be obviously understood by one of ordinary skill in the art through the following description.

To accomplish the above-mentioned objects, according to an embodiment of the present invention, there is provided a fitting frame having improved prefabricated rails, including: an upper frame body and a lower frame body located under and above door frames to have surfaces facing each other and molded through extrusion in a longitudinal direction thereof; and rail coupling bodies fastened to the facing surfaces of the upper frame body and the lower frame body in such a manner as to seat the door frames thereonto and to thus slidingly guide the door frames.

According to the embodiment of the present invention, the upper frame body and the lower frame body have rail insertion recesses formed on the surfaces facing each other in such a manner as to fastenedly insert the rail coupling bodies thereinto, each rail coupling body including: a rail body having the shape corresponding to the shape of each rail insertion recess; a bump having the shape corresponding to the outer peripheral surface of a roller of each door frame in such a manner as to be extended from top of the rail body in a longitudinal direction of the rail body, the rail body having a height greater than the depth of each rail insertion recess so that the roller can be seated onto top of the rail body; and a fastening support body extended from the underside of the rail body in such a manner as to be fastenedly inserted into each rail insertion recess in such a manner as to support the rail body by means of elastic forces, the fastening support body including: a first wall extended downwardly from one side of the underside of the rail body; a second wall extended downwardly from the other side of the underside of the rail body in such a manner as to be spaced apart from the first wall; thermal insulators located at spaces between support bodies formed on the facing surfaces of the first wall and the second wall; fastening protrusions formed on the outer surfaces of the first wall and the second wall in such a manner as to become gradually reduced in width toward the first wall and the second wall in up directions thereof from down directions thereof and to be thus fastened to fastening grooves formed on the rail insertion recess to the shapes corresponding thereto; elastic supports located on the undersides of the first wall and the second wall; and a third wall located spaced apart from the first wall and the second wall under the first wall and the second wall by means of the elastic supports in such a manner as to be seated onto the bottom of the rail insertion recess to support the first wall and the second wall thereagainst, each elastic support including: a base frame for supporting the first wall or the second wall; four base plates for supporting the base frame seated onto tops thereof; four pairs of support frames having first support frames and second support frames rotatably connected to each other on the undersides of the four base plates; and a support post having the shape of a rectangular post and configured to allow the first frames to be connected to top thereof in such a manner as to rotatably move the first frames slidingly in a horizontal direction and to allow the second frames to be connected to sides thereof in such a manner as to rotatably move the second frames slidingly in a vertical direction, the support post including: a post body having the shape of a rectangular post; a cross groove concavely formed to the shape of "+" on top of the post body; a cross elastic member having the shape corresponding to the cross groove in such a manner as to be inserted into the cross groove and configured to allow the undersides of the first frames to be rotatably connected to tops of the four branch ends thereof; four vertical grooves formed vertically on the respective sides of the post body; and four vertical elastic members having the shapes corresponding to the vertical grooves in such a manner as to be inserted into the vertical grooves and configured to allow the undersides of the second frames to be rotatably connected to the outsides of tops thereof; the cross elastic member including: a cross case having a "+"-shaped empty internal space; a top support having the shape of a regular hexahedron in such a manner as to be located at the center of the cross case; four top elastic materials located on the respective side surfaces of the top support; four top elastic supports located on the ends of the respective branches of the internal space of the cross case in such a manner as to be supported by the elastic forces of the top elastic materials; and four top connection links located on the ends of the respective branches of the cross groove in such a manner as to be kept at a given gap from the cross case by means of the support bars located between one side surface facing the cross case and the top elastic supports, to allow the undersides of the first frames to be rotatably connected to tops thereof, and to slidingly move along the cross groove in a direction of a center at which the respective branches of the cross groove meet, each vertical elastic member including: a vertical case having an empty internal space corresponding to the vertical groove; a side support having the shape of a regular hexahedron in such a manner as to be located at the lower space of the vertical case; a side elastic material located on top of the side support; a side elastic support located on top of the internal space of the vertical case in such a manner as to be supported by the elastic force of the side elastic material; and a side connection link located on the upper end of the vertical groove in such a manner as to be kept at a given gap from the vertical case by means of a support bar located between one side surface facing the vertical case and the side elastic support, to allow the lower side of the second frame to be rotatably connected to the outer surfaces thereof, and to slidingly move along the vertical groove in a downward direction of the vertical groove.

According to one aspect of the present invention, the fitting frame having improved prefabricated rails is capable of detachably mounting the rail coupling bodies, thereby allowing doors as weight bodies to be more conveniently installed thereon, capable of enabling, even if the rail coupling bodies are damaged due to unexpected collisions or accidents, only the damaged rail coupling bodies to be reasonably exchanged with new ones, capable of having no unnecessary gaps and getting tight in a space between the fitting frame and the doors, thereby providing excellent soundproof and thermal insulation performance, capable of having no resistant element, thereby allowing the doors to be more gently open and closed, and capable of removing only the rail coupling bodies to simply separate the doors therefrom, thereby performing convenient cleaning for the fitting frame exposed to a plane state to permit the outer appearance and sanitary state of the fitting frame to be kept cleanly.

In addition, even in the case where the fitting frame is located on a place where a worker's hand does not reach, the movable lifting device is additionally located so that the fitting frame can be easily installed, irrespective of the height of the installation place.

Moreover, even if the movable lifting device is broken, while the worker is placed on top thereof, the hydraulic jack as a main component of the movable lifting device can be prevented from being damaged or broken.

DETAILED DESCRIPTION OF THE INVENTION

Figure 1:
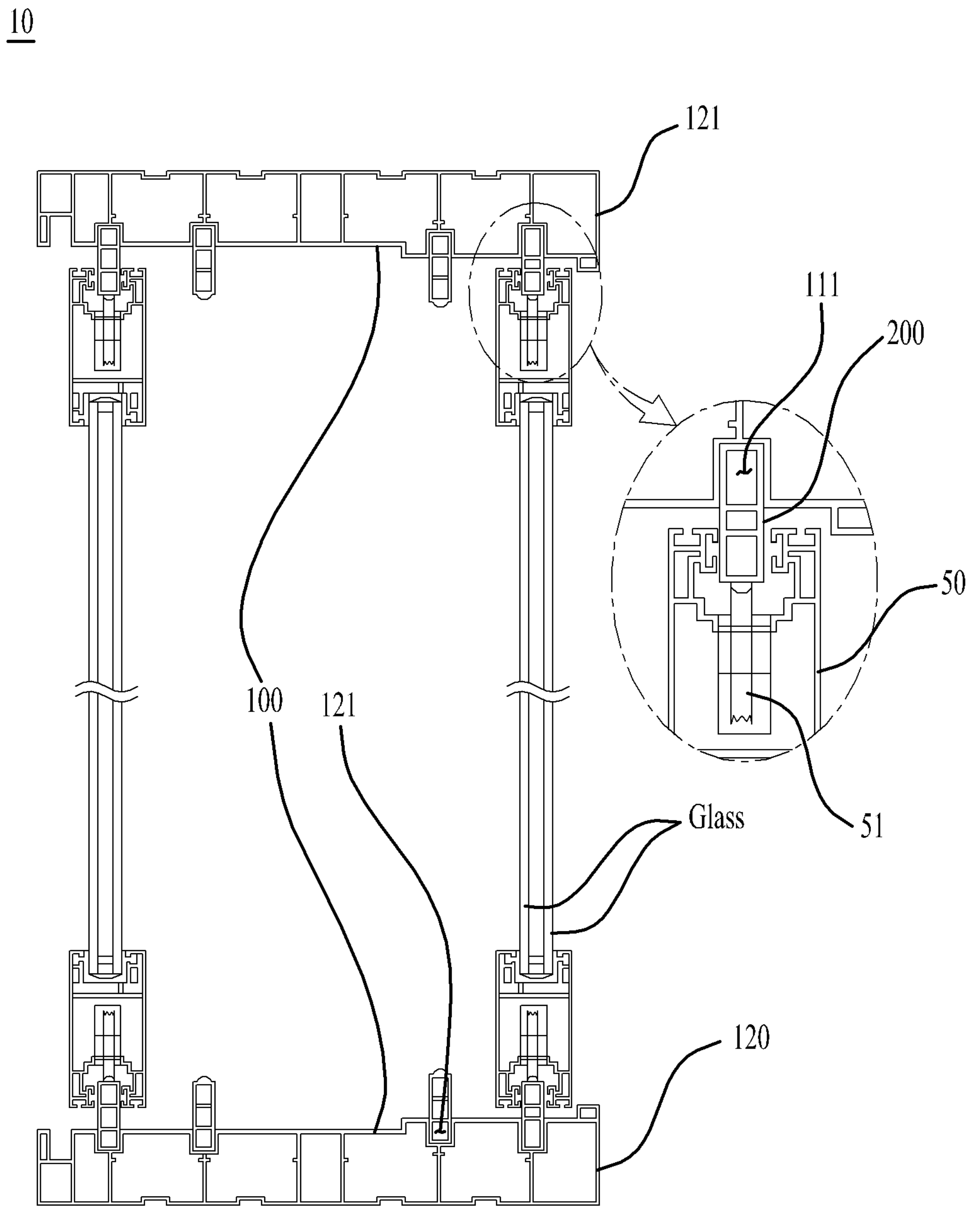
FIG. 1 is a schematic view showing a fitting frame having improved prefabricated rails according to an embodiment of the present invention.

Hereinafter, the present invention will be explained in detail with reference to the attached drawings. Embodiments of the present invention as will be discussed later will be described in detail so that they may be carried out easily by those having ordinary skill in the art. The present invention may be modified in various ways and may have several exemplary embodiments. Before the present invention is disclosed and described, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Therefore, the present invention is not limited with the embodiments as will be explained herein. In the drawings, similar reference numerals will have the same or similar functions as each other or to each other on various aspects.

Now, embodiments of the present invention will be explained in detail with reference to the attached drawings.

FIG. 1 is a schematic view showing a fitting frame having improved prefabricated rails according to an embodiment of the present invention.

Referring to FIG. 1, a fitting frame 10 having improved prefabricated rails according to an embodiment of the present invention includes frame bodies 100 and rail coupling bodies 200.

The frame bodies 100 include an upper frame body 110 and a lower frame body 120 located under and above door frames 50 to have surfaces facing each other and molded through extrusion in a longitudinal direction.

In this case, the upper frame body 110 and the lower frame body 120 have rail insertion recesses 111 and 121 formed on the surfaces facing each other in such a manner as to fastenedly insert the rail coupling bodies 200 thereinto.

The rail coupling bodies 200 are respectively fastened to the rail insertion recesses 111 and 121 formed on the facing surfaces of the upper frame body 110 and the lower frame body 120 in such a manner as to seat the door frames 50 thereonto and to thus slidingly guide the door frames 50.

That is, rollers 51 of the door frames 50 are seated onto tops of the rail coupling bodies 200 inserted into the rail insertion recesses 121 of the lower frame body 120, and as the door frames 50 are pushed to be open and closed by a user, the rollers 51 rotatingly move along the rail coupling bodies 200, so that the door frames 50 can move gently.

Under the above-mentioned configuration, the fitting frame 10 having improved prefabricated rails according to the present invention is capable of detachably mounting the rail coupling bodies, thereby allowing doors as weight bodies to be more conveniently installed thereon, capable of enabling, even if the rail coupling bodies are damaged due to unexpected collisions or accidents, only the damaged rail coupling bodies to be reasonably exchanged with new ones, capable of having no unnecessary gaps and getting tight in a space between the fitting frame and the doors, thereby providing excellent soundproof and thermal insulation performance, capable of having no resistant element, thereby allowing the doors to be more gently open and closed, and capable of removing only the rail coupling bodies to simply separate the doors therefrom, thereby performing convenient cleaning for the fitting frame exposed to a plane state to permit the outer appearance and sanitary state of the fitting frame to be kept cleanly.

Figure 2:
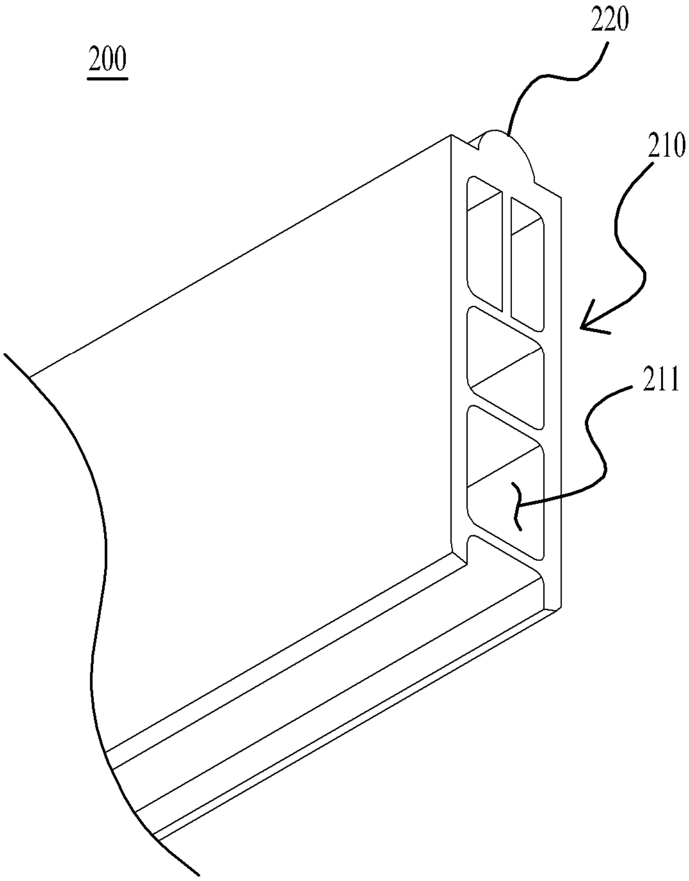
FIG. 2 is a perspective view showing an example of a rail coupling body of FIG. 1.

FIG. 2 is a perspective view showing an example of the rail coupling body of FIG. 1.

Referring to FIG. 2, the rail coupling body 200 according to an embodiment of the present invention includes a rail body 210 and a bump 220.

The rail body 210 has a shape corresponding to the shape of each rail insertion recess 111 or 121, and the bump 220 is extended from top of the rail body 210 in a longitudinal direction of the rail body 210.

In this case, the rail body 210 desirably has a height greater than the depth of each rail insertion recess 111 or 121 so that the roller 51 can be seated onto top of the rail body 210.

Figure 3:
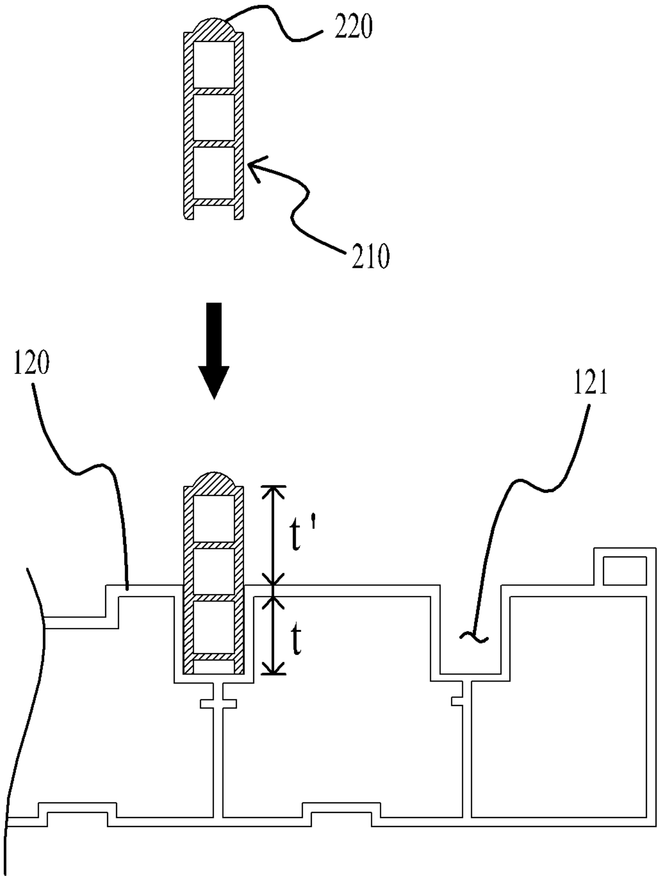
FIG. 3 is an exemplary view showing a process of installing the rail coupling body of FIG. 2.

Referring to FIG. 1 or 3, if the depth of each rail insertion recess 111 or 121 is t, the height of the rail body 210 is t+t', and in this case, the rail body 210 is exposed to the outside of each rail insertion recess 111 or 121 by the height of t', so that a portion where the roller 51 is seated to move can be exposed to the outside.

Further, the rail body 210 is not filled completely in internal space thereof, and desirably, it has hollow holes 211 formed longitudinally as shown in FIG. 2 to achieve unit price reduction and thermal insulation improvement.

The bump 220 has a shape corresponding to the shape of the outer peripheral surface of the roller 51 of each door frame 50 and is extended longitudinally along top of the rail body 210.

That is, the semi-circular bump 220 is shown in FIG. 2, but the bump 220 may have various shapes according to the shape of the outer peripheral surface of the roller 51. For example, if a triangular or polygonal groove is formed on the outer peripheral surface of the roller 51, the bump 220 has the same triangular or polygonal shape as the roller 51.

In this case, the rail coupling body 200 as shown in FIG. 2 or the lower frame body 120 as shown in FIG. 3 can be applied in the same manner as above to the upper frame body 110 and the rail coupling body 200 coupled to the upper frame body 110. Accordingly, an explanation of the upper frame body 110 and the rail coupling body 200 coupled to the upper frame body 110 will be avoided for the brevity of the description.

Figure 4:
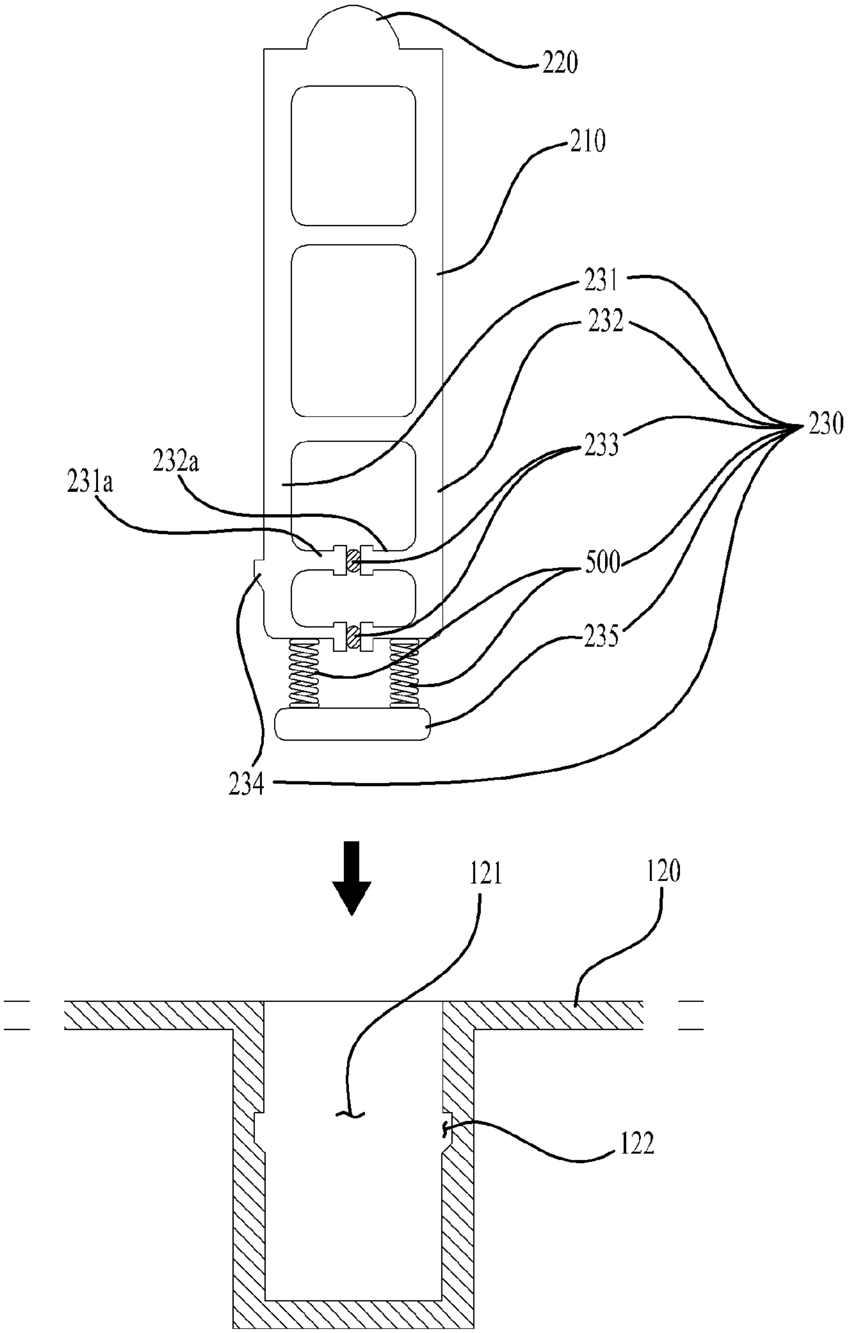
FIG. 4 is a front view showing another example of the rail coupling body of FIG. 1.
Figure 5:
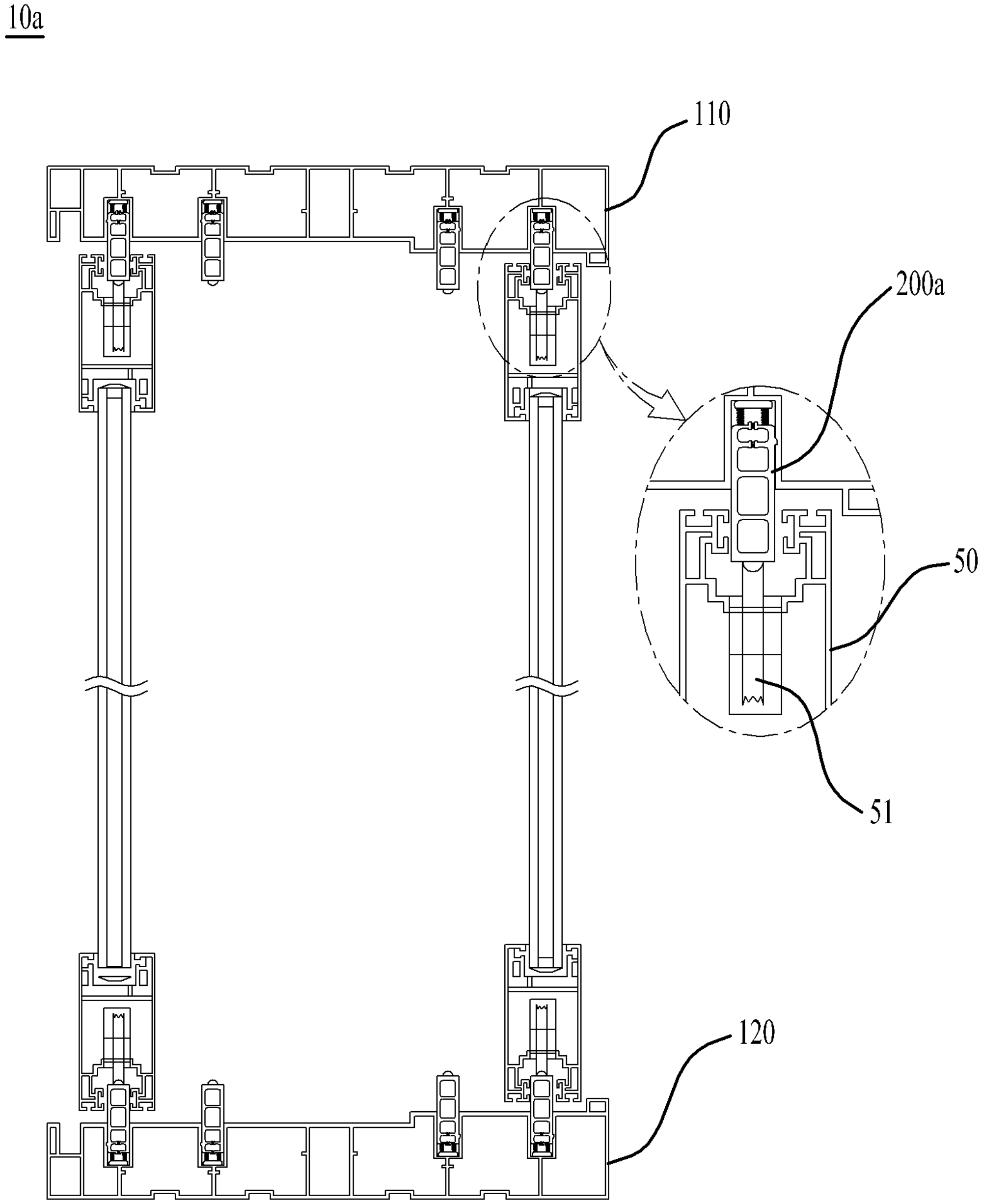
FIG. 5 is an exemplary view showing a process of installing the rail coupling body of FIG. 4.

FIG. 4 is a front view showing another example of the rail coupling body of FIG. 1.

Referring to FIG. 4, a rail coupling body **200*a* as another example of the rail coupling body 200 includes a rail body 210, a bump 220, and a fastening support body 230. In this case, the rail body 210 and the bump 220 are the same as in FIG. 2, and accordingly, an explanation of the rail body 210 and the bump 220** will be avoided.

The fastening support body 230 is extended from the underside of the rail body 210 in such a manner as to be fastenedly inserted into the rail insertion recess 111 or 121 and supports the rail body 210 by means of elastic forces.

According to an embodiment of the present invention, the fastening support body 230 includes a first wall 231, a second wall 232, thermal insulators 233, fastening protrusions 234, elastic supports 500, and a third wall 235.

The first wall 231 is extended downwardly from one side of the underside of the rail body 210 in such a manner as to be spaced apart from the second wall 232, has at least one support wall **231*a* formed on the surface facing the second wall 232, and is supported on the underside thereof by one side elastic support 500**.

The second wall 232 is extended downwardly from the other side of the underside of the rail body 210 in such a manner as to be spaced apart from the first wall 231, has at least one support wall **232*a* formed on the surface facing the first wall 231, and is supported on the underside thereof by the other side elastic support 500**.

The thermal insulators 233 are located at spaces between the support walls formed on the facing surfaces of the first wall 231 and the second wall 232 and are made of an insulation material such as plastic and the like to prevent heat from being transferred to the other wall from one wall through the support wall **231*a* or 232*a***.

The fastening protrusions 234 are formed on the outer surfaces of the first wall 231 and the second wall 232, and if the rail coupling body **200*a* is inserted into the rail insertion recess 121, the fastening protrusions 234 are fastened to fastening grooves 122 of the rail insertion recess 121, thereby preventing from the rail coupling body 200*a* from being separated from the rail insertion recess 121**.

To prevent the rail coupling body **200*a* from being separated easily from the rail insertion recess 121, in this case, the fastening protrusions 234 become gradually reduced in width toward the first wall 231 and the second wall 232 in up directions thereof from down directions thereof. That is, the fastening protrusions 234** have inverted right-angled triangle-like sectional shapes.

The elastic supports 500 are located on the undersides of the first wall 231 and the second wall 232 and support the first wall 231 and the second wall 232 against top of the third wall 235 by means of elastic forces.

According to an embodiment of the present invention, the elastic supports 500 are made of elastic materials such as general springs and the like, but only if given objects are capable of supporting the first wall 231 and the second wall 232 by means of elastic forces, they may be used freely as the elastic supports 500.

The third wall 235 is located spaced apart from the first wall 231 and the second wall 232 under the first wall 231 and the second wall 232 by means of the elastic supports 500 and is thus seated onto the bottom of the rail insertion recess 111 or 121 to support the first wall 231 and the second wall 232 thereagainst.

According to an embodiment of the present invention, the rail insertion grooves 111 and 121 have the fastening grooves 122 formed on both side surfaces in such a manner as to have the shapes corresponding to the shapes of the fastening protrusions 234, and accordingly, the fastening protrusions 234 are fitted to the fastening grooves 122.

Figure 6:
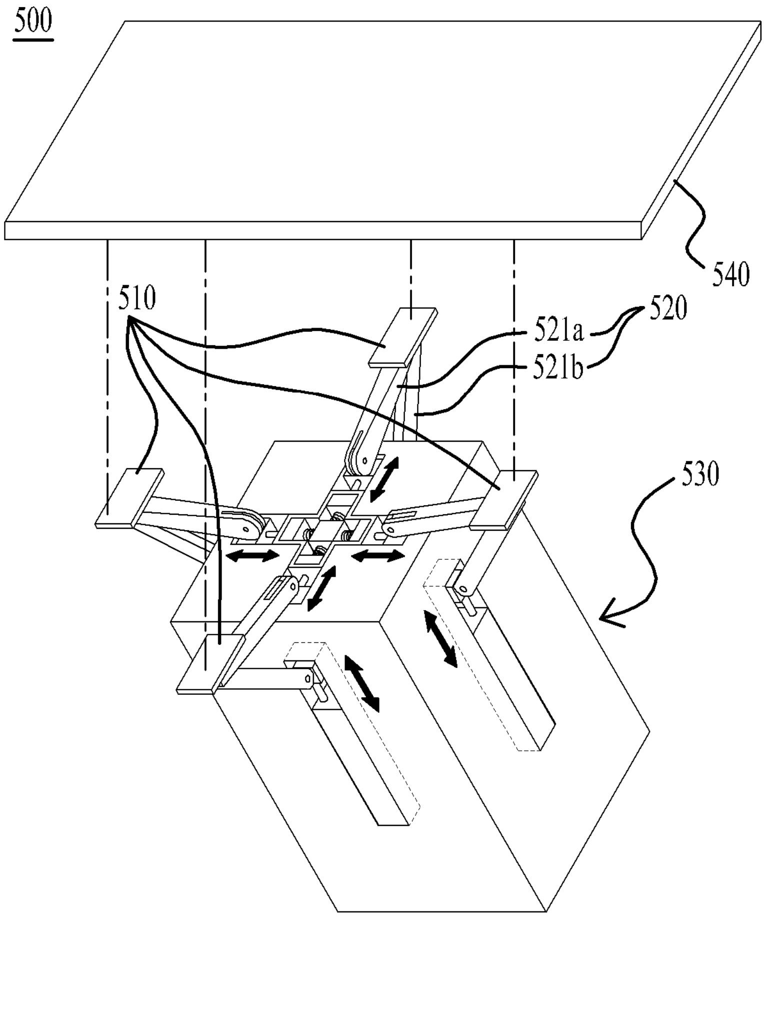
FIG. 6 is a perspective view showing an example of the elastic support of FIG. 4.

FIG. 6 is a perspective view showing an example of the elastic support 500 of FIG. 4.

Referring to FIG. 6, the elastic support 500 includes a base frame 540, four base plates 510, four pairs of support frames 520, and a support post 530.

The base frame 540 is supported against the base plates 510 located on the underside thereof and serves to support the first wall 231 and the second wall 232 by means of the elastic forces.

The base plates 510 support the base frame 540 seated onto tops thereof and are supported against the support post 530 by means of the support frames 520 connected to the undersides thereof.

That is, the base plates 510 seat the base frame 540 onto tops thereof and serve to allow the vibrations or impacts received from the base frame 540 to be absorbed to the support frames 520 slidingly moving in left and right directions (that is, toward first frames 521*a*) or in up and down directions (that is, toward second frames 521*b*) by means of elastic forces, thereby reducing the vibrations or impacts.

According to the present invention, in addition, the lengths of the first frames 521*a* or the second frames 521*b* may be freely formed, thereby overcoming the limitations of the existing elastic bodies capable of adjusting only the heights in up and down directions to reduce impacts, and accordingly, the supported positions by the base plates 510 can be freely adjusted in the left and right directions as well as in the up and down directions.

The support frames 520 have the first support frames 521*a* and the second support frames 521*b* rotatably connected to each other to the undersides of the four base plates 510 to thus support the base plates 510, and as mentioned above, the lengths of the first frames 521*a* or the second frames 521*b* are adjusted to thus determine the supported positions of the support frame 540 by the base plates 510.

In this case, tops of the first support frames 521*a* and the second support frames 521*b* are connected to the undersides of the base plates 510. The undersides of the first frames 521*a* are connected to top of the support post 530 in such a manner as to rotatably move slidingly in a horizontal direction, and the undersides of the second frames 521*b* are connected to sides of the support post 530 in such a manner as to rotatably move slidingly in a vertical direction.

That is, the first support frames 521*a* or the second support frames 521*b* rotate or slidingly move on top or sides of the support post 530 by means of elastic forces to thus transfer the vibrations or impacts received from the base plates 510 to the support post 530.

The support post 530, which has the shape of a rectangular post, is configured to allow the undersides of the first frames 521*a* to be connected to top thereof so that the first frames 521*a* rotatably move slidingly in the horizontal direction and to allow the undersides of the second frames 521*b* to be connected to sides thereof so that the second frames 521*b* rotatably move slidingly in the vertical direction, and when the first frames 521*a* or the second frames 521*b* slidingly move, accordingly, the support post 530 serves to absorb the vibrations or impacts through elastic forces (that is, cross elastic member 533 or vertical elastic members 535 as will be discussed later).

The base plates 510 or the support frames 520, which are structured symmetrically with one another, operate in the same manner as one another, and as mentioned above, accordingly, the explanation of one base plate 510 or one support frame 520 will be given in the same manner as of other base plates 510 or other support frames 520. For the brevity of the description, therefore, the explanation of other base plates 510 or other support frames 520 will be avoided.

The elastic support 500 having the above-mentioned configuration may be located to have a symmetrical structure in up and down directions. FIG. 6 shows the case where the respective parts of the elastic support 500 are located only on the top of the support post 530, but the parts related to the four base plates 510 and the four pairs of support frames 520 may be located on the underside of the support post 500 in the same manner as above.

The elastic support 500 having the above-mentioned configuration can have more improved support stability when compared to the case where the first wall 231 and the second wall 232 are supported by using simple structural bodies like springs, and even in the case where various kinds of vibrations or impacts are transmitted to the window or door, the elastic support 500 can absorb the vibrations and impacts effectively, thereby providing an appropriate degree of seismic performance for seismic design.

Figure 7:
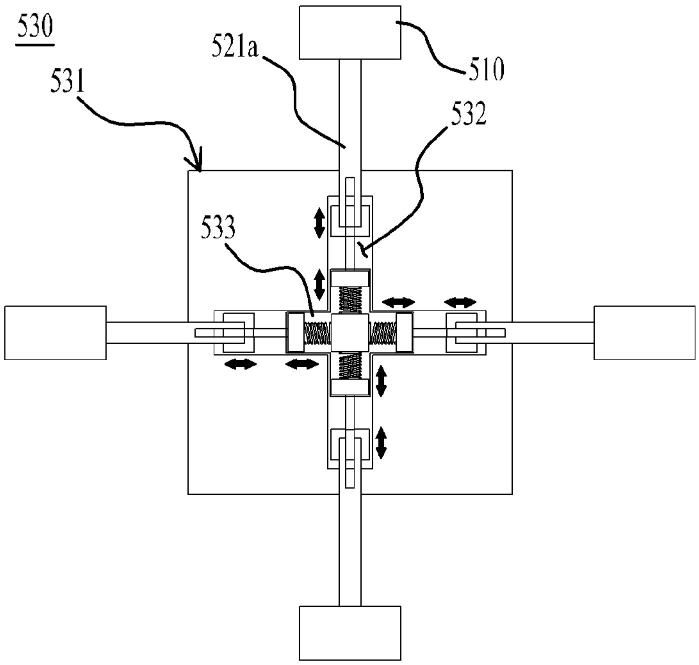
FIGS. 7 and 8 are top and side views showing the support post of FIG. 6.
Figure 8:
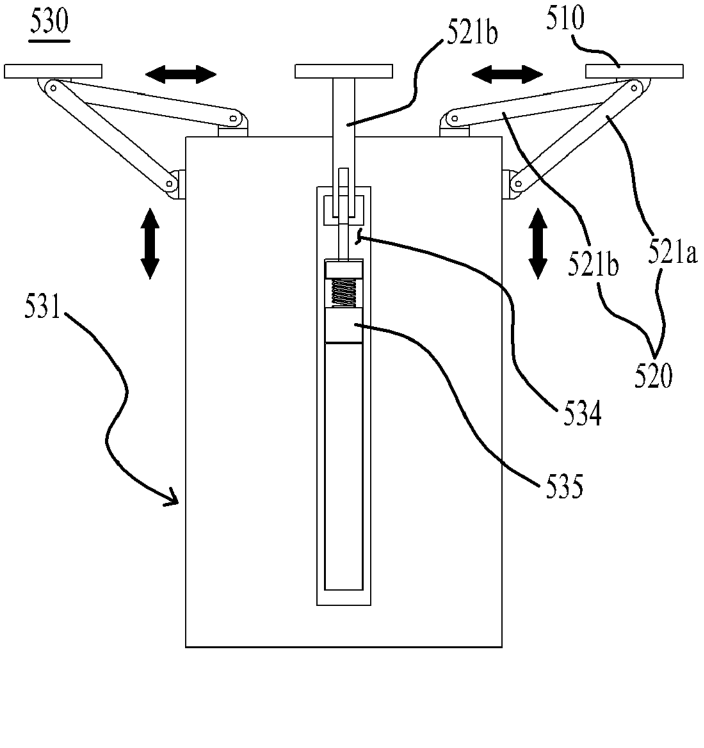

FIGS. 7 and 8 are top and side views showing the support post of FIG. 6.

Referring to FIG. 7, the support post 530 includes a post body 531, a cross groove 532, a cross elastic member 533, four vertical grooves 534 (See FIG. 8), and four vertical elastic members 535 (See FIG. 8).

The post body 531 has the shape of a rectangular post and is configured to have the cross groove 532 formed on top thereof and the vertical grooves 534 formed on the respective sides thereof.

The cross groove 532 is concavely formed to the shape of "+" on top of the post body 531 in such a manner as to insert the cross elastic member 533 thereinto.

The cross elastic member 533 has the shape corresponding to the cross groove 532 in such a manner as to be inserted into the cross groove 532, and further, the cross elastic member 533 is configured to allow the undersides of the first frames 521*a* to be rotatably connected to tops of the four branch ends thereof to thus absorb and reduce the vibrations or impacts received from the first frames 521*a* by means of elastic forces.

The vertical grooves 534 are formed vertically on the respective sides of the post body 532 in such a manner as to insert the vertical elastic members 535 thereinto.

The vertical elastic members 535 have the shapes corresponding to the vertical grooves 534 in such a manner as to be inserted into the vertical grooves 534, and further, the vertical elastic members 535 are configured to allow the undersides of the second frames 521*b* to be rotatably connected to the outsides of tops thereof to thus absorb and reduce the vibrations or impacts received from the second frames 521*b* by means of elastic forces.

Figure 9:
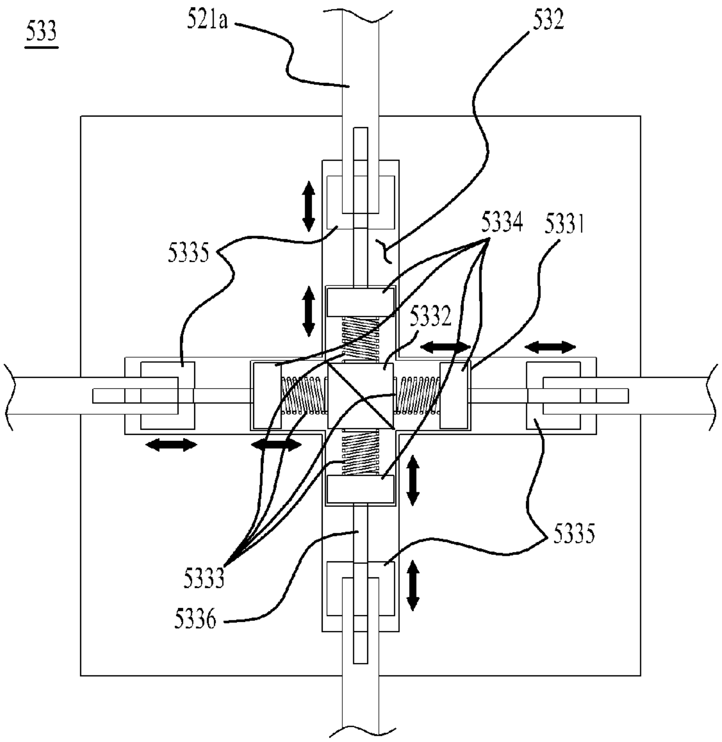
FIG. 9 is a top view showing a cross elastic member of FIG. 6.

FIG. 9 is a top view showing the cross elastic member of FIG. 7.

Referring to FIG. 9, the cross elastic member 533 includes a cross case 5331, a top support 5332, four top elastic materials 5333, four top elastic supports 5334, and four top connection links 5335.

The cross case 5331 has a "+"-shaped empty internal space in such a manner as to be inserted into the cross groove 532 to mount the top support 5332, the four top elastic materials 5333, and the four top elastic supports 5334 as will be discussed later in the internal space thereof.

In this case, as shown in FIG. 9, the lengths of the respective branches of the cross case 5331 are shorter than those of the respective branches of the cross groove 532, so that the top connection links 5335 are located in the spaces formed on the outer sides of the cross case 5331 in such a manner as to be slidingly movable.

The top support 5332 has the shape of a regular hexahedron and is located at the center of the cross case 5331 in such a manner as to allow the top elastic materials 5333 to be supportingly disposed on the four outer surfaces thereof.

The top elastic materials 5333 are located on the respective side surfaces of the top support 5332 to support the top elastic supports 5334 by means of elastic forces thereof, so that the vibrations or impacts received from the top elastic supports 5334 can be absorbed to the top elastic materials 5333.

The top elastic supports 5334 are located on the ends of the respective branches of the internal space of the cross case 5331 in such a manner as to be supported by the elastic forces of the top elastic materials 5333 and serve to support the top connection links 5335 by means of support bars 5336 located between the top connection links 5335 and the top elastic supports 5334.

The top connection links 5335 are located on the ends of the respective branches of the cross groove 532 in such a manner as to be kept at a given gap from the cross case 5331 by means of the support bars 5336 located between one side surface facing the cross case 5331 and the top elastic supports 5334, to allow the undersides of the first frames 521*a* to be rotatably connected to tops thereof, and to slidingly move along the cross groove 532 in a direction of a center at which the respective branches of the cross groove 532 meet according to the up and down movements of the base plates 510.

Figure 10:
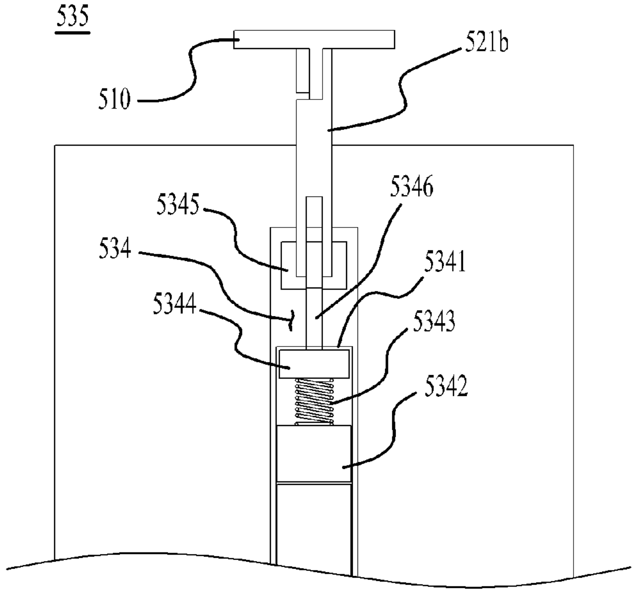
FIG. 10 is a side view showing a vertical elastic member of FIG. 8.

FIG. 10 is a side view showing the vertical elastic member of FIG. 8.

Referring to FIG. 10, each vertical elastic member 535 includes a vertical case 5341, a side support 5342, a side elastic material 5343, a side elastic support 5344, and a side connection link 5345.

The vertical case 5341 has an empty internal space corresponding to the vertical groove 534 in such a manner as to locate the side support 5342, the side elastic material 5343, and the side elastic support 5344 sequentially on the lower side of the internal space thereof.

The side support 5342 has the shape of a regular hexahedron and is located at the lower space of the vertical case 5341 in such a manner as to place the side elastic material 5343 on top thereof to support the side elastic material 5343 thereagainst.

The side elastic material 5343 is located on top of the side support 5342 to support the side elastic support 5344 by means of an elastic force thereof, so that the vibrations or impacts received from the side elastic support 5344 can be absorbed to the side elastic material 5343.

The side elastic support 5344 is located on top of the internal space of the vertical case 5341 in such a manner as to be supported by the elastic force of the side elastic material 5343 and serves to support the side connection link 5345 by means of a support bar 5346 located between the side connection link 5345 and the side elastic support 5344.

The side connection link 5345 is located on the upper end of the vertical groove 534 in such a manner as to be kept at a given gap from the vertical case 5341 by means of the support bar 5336 located between one side surface facing the vertical case 5341 and the side elastic support 5344, to allow the lower side of the second frame 521*b* to be rotatably connected to the outer surface thereof, and to slidingly move along the vertical groove 534 in a downward direction of the vertical groove 534.

Figure 11:
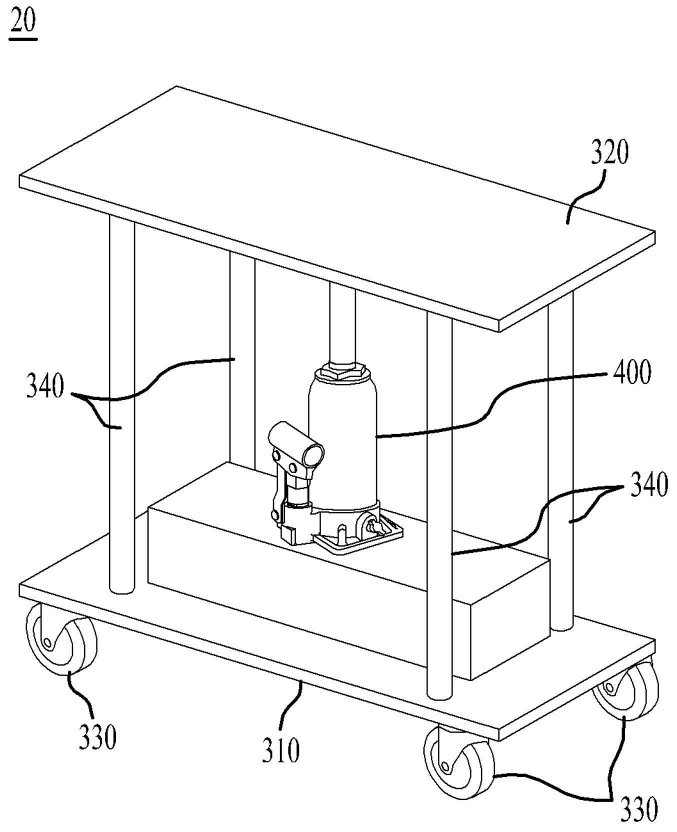
FIG. 11 is a perspective view showing a movable lifting device having a hydraulic jack according to an embodiment of the present invention.

FIG. 11 is a perspective view showing a movable lifting device having a hydraulic jack according to an embodiment of the present invention.

In specific, a movable lifting device 20 having a hydraulic jack according to an embodiment of the present invention includes a lower frame 310, an upper frame 320, and a hydraulic jack 400.

The lower frame 310 is a member for constituting the lower surface of the movable lifting device 20. Further, the lower frame 310 has moving means 330 located on the underside thereof, and accordingly, the movable lifting device 20 according to the present invention is movable.

In addition, the lower frame 310 has at least one or more posts 340 located on the top thereof.

As shown, the four posts 340 are located on the corners of the lower frame 310, but the number of posts 340 to be installed may not be limited thereto.

The posts 340 are shaped variable in length. For example, each post 340 includes an outer post having a first diameter and an inner post having a diameter smaller than the first diameter in such a manner as to be inserted into the outer post and slide along a longitudinal direction of the outer post. In this case, if the inner post slides in a direction where it is inserted into the outer post, the entire length of the post 340 becomes reduced, and if the inner post slides in a direction where it is drawn from the outer post, the entire length of the post 340 becomes extended. However, the post 340 may not be limited to the structure as mentioned above, and only if the length of the post 340 can be varied by means of an external force, the post 340 may be of course replaced with other conventional components.

The upper frame 320 is supported against the lower frame 310 by means of at least one or more posts 340 in such a manner as to be located in parallel with the lower frame 310. An object to be lifted, that is, a worker can be placed on top of the upper frame 320, and if the lengths of the posts 340 are extended, the upper frame 320 is lifted up from the surface of ground to move the worker placed thereon up.

The hydraulic jack 400 is a part for providing a lifting force to the posts 340. The hydraulic jack 400 is located between the lower frame 310 and the upper frame 320, and to lift up the object placed on the upper frame 320, the hydraulic jack 400 varies the lengths of the posts 340 with the external force supplied from a user to lift the upper frame 320 up. An explanation of the hydraulic jack 400 will be given in detail with reference to FIGS. 12 to 14.

Figure 12:
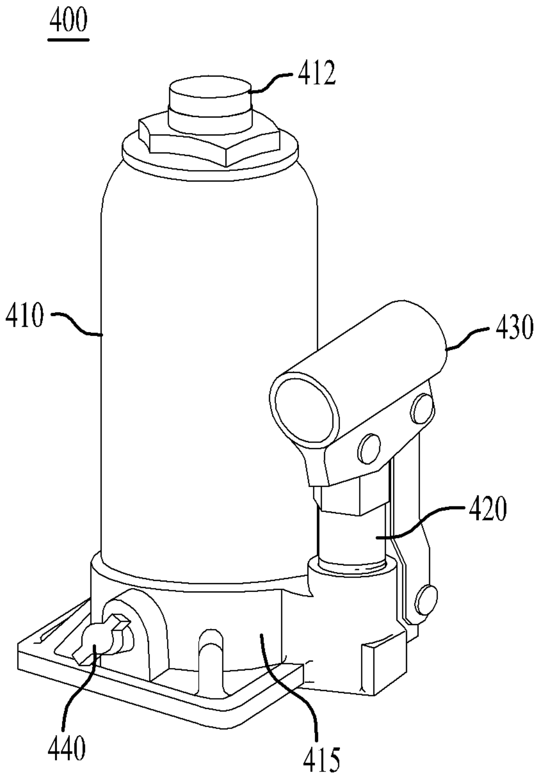
FIG. 12 is a perspective view showing the hydraulic jack of FIG. 11.
Figure 13:
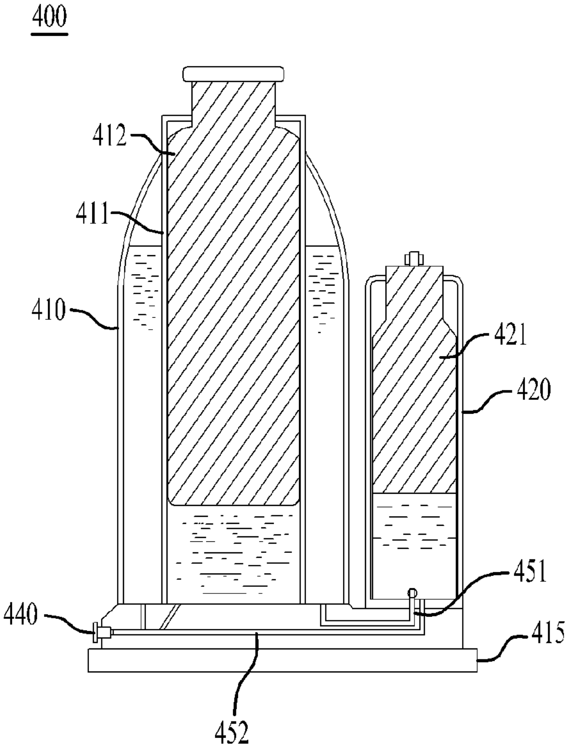
FIG. 13 is a sectional view showing the internal configuration and operating principle of the hydraulic jack in FIGS. 11 and 12.

FIG. 12 is a perspective view showing the hydraulic jack 400 of FIG. 11, and FIG. 13 is a sectional view showing the internal configuration and operating principle of the hydraulic jack 400 in FIGS. 11 and 12.

In specific, the hydraulic jack 400 according to an embodiment of the present invention includes a body 410, an external cylinder 420, a pressurizing lever 430, and a relief valve 440.

The body 410 has a cylindrical member with a space in which an operating fluid is stored in such a manner as to locate an internal cylinder 411 and a lifting piston 412 in the internal space thereof.

The internal cylinder 411 is a cylindrical member located at the inside of the body 410 so that the operating fluid is stored between the body 410 and the internal cylinder 411.

The lifting piston 412 is located in the internal cylinder 411 in such a manner as to be reciprocated in a longitudinal direction of the internal cylinder 411. That is, if the operating fluid is supplied to the internal cylinder 411, the lifting piston 412 is lifted up by means of the pressure of the operating fluid to allow the lengths of the posts 340 to be extended, so that the upper frame 320 coming into contact with top of the lifting piston 412 can be lifted up from the surface of ground.

The external cylinder 420 is a member for supplying the fluid to the internal cylinder 411 and is connected to the body 410 by means of a fastening bracket 415 so that it can be maintained to a closed state from the body 410. The external cylinder 420 has a pressurizing piston 421 located at the inside thereof, and the pressurizing piston 421 is moved up and down by means of the pressurizing lever 430.

The pressurizing lever 430 is a member that is connected to the pressurizing piston 421 to transfer the external force provided from the user to the pressurizing piston 421.

Figure 14:
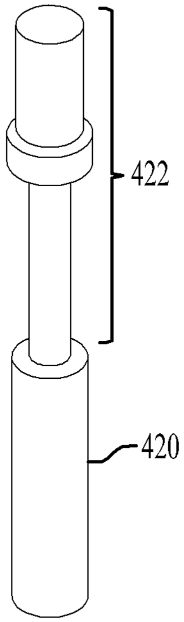
FIG. 14 is a perspective view showing an external cylinder and a connector of the movable lifting device.

FIG. 14 is a perspective view showing the external cylinder 420 of the hydraulic jack 400 and a connector 422 connecting the pressurizing piston 421 of the external cylinder 420 to the pressurizing lever 430, and the pressurizing piston 421 located at the inside of the external cylinder 420 is physically coupled to the pressurizing lever 430 by means of the connector 422, so that through such structural features, the pressurizing piston 421 can receive the external force applied through the pressurizing lever 430 from the user.

The pressurizing lever 430 has a through hole formed thereon in such a manner as to be coupled to a member such as a pipe grasped by the user, and in a state where the pipe is coupled to the pressurizing lever 430, accordingly, if the pipe is moved up and down by the user, the external force is applied to the pressurizing lever 430. According to another embodiment of the present invention, the pressurizing lever 430 may include the pipe as mentioned above or may be provided as an integral body with the pipe.

Referring in specific to the operating principle of the hydraulic jack 400 according to the embodiment of the present invention, if the pressurizing lever 430 is lifted up by the user in the state where the object to be lifted by the hydraulic jack 400 is placed on the upper frame 320, the pressurizing piston 421 is moved up to cause a negative pressure to be formed in the external cylinder 420. Accordingly, the operating fluid stored between the body 410 and the internal cylinder 411 is introduced into the external cylinder 420 along a suction pipe 451.

After that, if the pressurizing lever 430 is pressed by the user, the pressurizing piston 421 is moved down to apply a pressure to the operating fluid sucked to the external cylinder 420. Accordingly, the operating fluid sucked to the external cylinder 420 is moved to the internal cylinder 411 along a supply pipe 452. In this case, a backflow prevention valve may be mounted on one end of the suction pipe 451 connected to the external cylinder 420 so that the operating fluid can be transferred only along the supply pipe 452. Next, the lifting piston 412 is moved up by means of the pressure of the operating fluid introduced into the internal cylinder 411. The above-mentioned processes are repeatedly carried out as the pressurizing lever 430 is moved up and down by the user, and accordingly, the pressure of the internal cylinder 411 is gradually increased to allow the lifting piston 412 to be gradually moved up, thereby lifting up the object placed on top of the lifting piston 412.

The relief valve 440 is a member that is located on one end of the supply pipe 452 and serves to release the pressure of the internal cylinder 411 through the user's control. That is, if it is desired to move down the object to its original position, the relieve valve 440 is open to allow the operating fluid introduced into the internal cylinder 411 and filled at a high pressure therein to be collected through a collection pipe 530 to the body 410 under the pressure of the lifting piston 412 receiving the gravity of the object, and as the pressure of the internal cylinder 411 becomes low, accordingly, the lifting piston 412 is moved down by means of the gravity of the object, thereby allowing the object to be moved down to its original position.

As mentioned above, the hydraulic jack 400 according to the embodiment of the present invention can lift up and down the object whose weight is heavy by means of the small forces applied repeatedly to the pressurizing lever 430 from the user.

According to another embodiment of the present invention, further, the size of pressure applied to the lifting piston 412 may be adjusted by the user according to the kind of object and the kind of work to be carried out. An explanation of the adjustment of the size of pressure applied to the lifting piston 412 will be given with reference to FIGS. 15 to 18.

Figure 15:
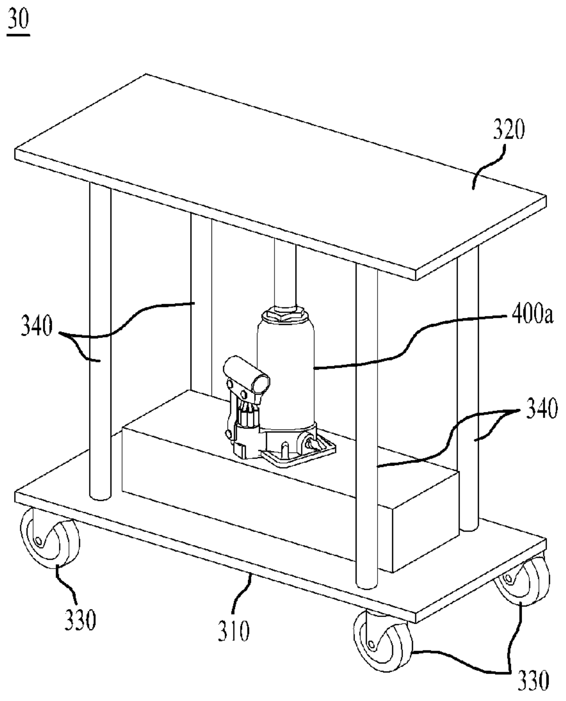
FIG. 15 is a perspective view showing a movable lifting device having a hydraulic jack according to another embodiment of the present invention.

FIG. 15 is a perspective view showing a movable lifting device having a hydraulic jack according to another embodiment of the present invention.

In specific, a movable lifting device 30 having a hydraulic jack according to another embodiment of the present invention includes a lower frame 310, an upper frame 320, and a hydraulic jack 400*a*.

In this case, the lower frame 310 and the upper frame 320 constituting the movable lifting device 30 having a hydraulic jack according to another embodiment of the present invention, which are shown in FIG. 15, are the same as the lower frame 310 and the upper frame 320 constituting the movable lifting device 20 having the hydraulic jack according to one embodiment of the present invention, which are shown in FIG. 11, and accordingly, a repeated explanation will be avoided below.

Further, the movable lifting device 30 having a hydraulic jack according to another embodiment of the present invention is different from the movable lifting device 20 having the hydraulic jack according to one embodiment of the present invention in that the hydraulic jack 400 is replaced with the hydraulic jack 400*a*. An explanation of the hydraulic jack 400*a* will be given with reference to FIGS. 16 to 18.

Figure 16:
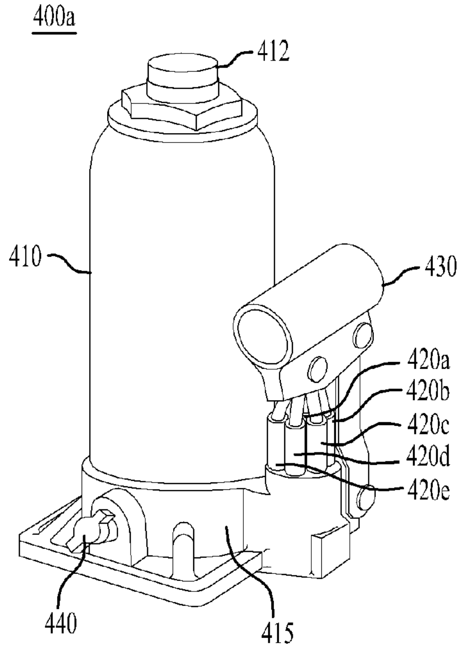
FIGS. 16 to 18 are perspective and sectional views showing the hydraulic jack of FIG. 15.
Figure 17:
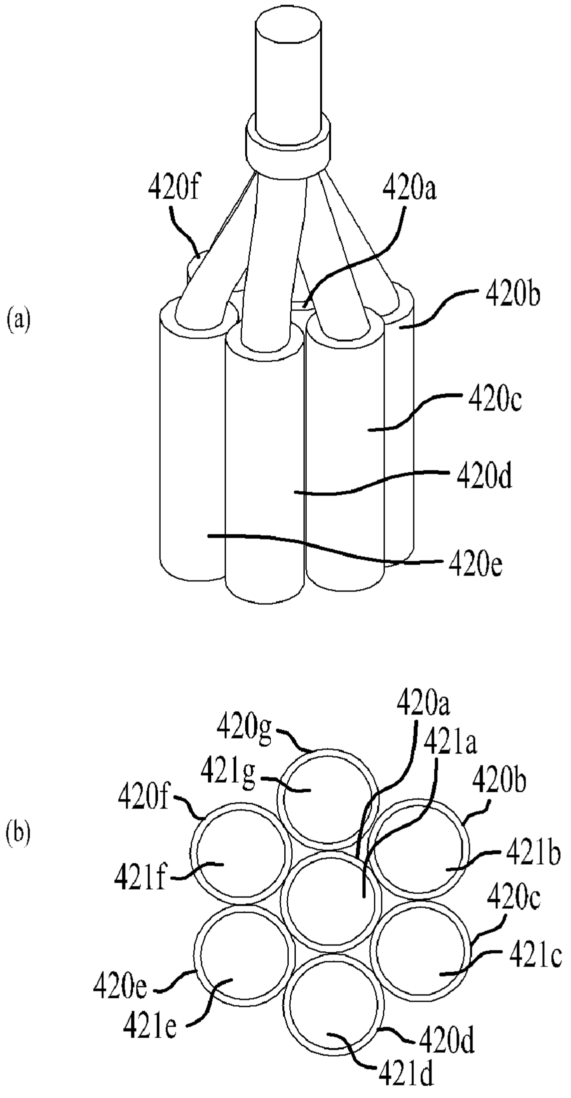
Figure 18:
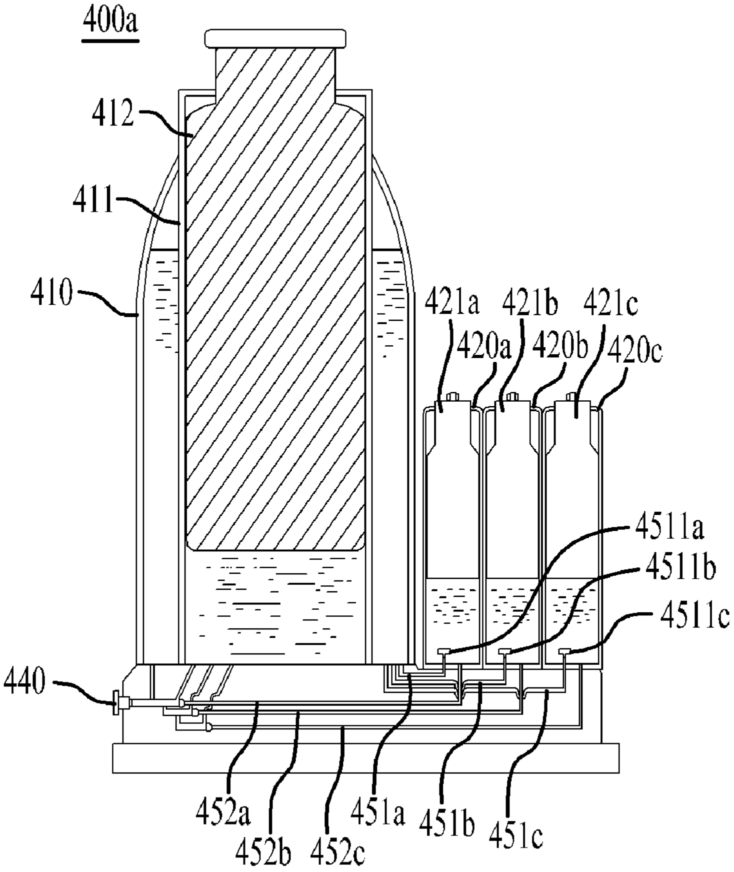

FIGS. 16 to 18 are perspective and sectional views showing the hydraulic jack 400*a* according to another embodiment of the present invention.

FIG. 16 is a perspective view showing the hydraulic jack 400*a* according to another embodiment of the present invention, FIG. 17 is a view showing external cylinders of the hydraulic jack 400*a*, and FIG. 18 is a sectional view showing the internal configuration and operating principle of the hydraulic jack 400*a* in FIG. 16.

In specific, the hydraulic jack 400*a* according to another embodiment of the present invention includes a body 410, external cylinders 420*a*, 420*b*, 420*c*, 420*d*, 420*e*, 420*f*, and 420*g*, a pressurizing lever 430, and a relief valve 440.

In this case, the body 410, the pressurizing lever 430 and the relief valve 440 constituting the hydraulic jack 400*a* according to another embodiment of the present invention, which are shown in FIG. 15, are the same as the body 410, the pressurizing lever 430 and the relief valve 440 constituting the hydraulic jack 400 according to one embodiment of the present invention, and accordingly, a repeated explanation will be avoided below.

Further, the hydraulic jack 400*a* according to another embodiment of the present invention is configured to allow the external cylinder 420 as shown in FIG. 12 to be provided plurally. That is, the hydraulic jack 400*a* according to another embodiment of the present invention is configured to have the pressurizing lever 430 connected to the plurality of external cylinders 420*a*, 420*b*, 420*c*, 420*d*, 420*e*, 420*f*, and 420*g*. Referring to FIG. 15, the hydraulic jack 400*a* according to another embodiment of the present invention is configured to have six external cylinders 420*b*, 420*c*, 420*d*, 420*e*, 420*f*, and 420*g* arranged around the first external cylinder 420*a* located along a center axis as an on-axis with respect to the pressurizing lever 430, but without being limited thereto, only if there are two or more external cylinders, the number of external cylinders is not limited particularly.

The respective external cylinders 420*a*, 420*b*, 420*c*, 420*d*, 420*e*, 420*f*, and 420*g* are configured to allow pressurizing pistons to be located at the insides thereof. That is, if the pressurizing lever 430 operates by the user to apply an external force to the hydraulic jack 400*a*, the pressurizing lever 430 distributedly transfers the external force received to the external cylinders 420*a*, 420*b*, 420*c*, 420*d*, 420*e*, 420*f*, and 420*g*.

In this case, if the external cylinders 420*a*, 420*b*, 420*c*, 420*d*, 420*e*, 420*f*, and 420*g* are designed to have the same diameter as one another, the external force transferred to the external cylinders 420*a*, 420*b*, 420*c*, 420*d*, 420*e*, 420*f*, and 420*g* can be uniformly distributed. However, if the external cylinders 420*a*, 420*b*, 420*c*, 420*d*, 420*e*, 420*f*, and 420*g* are designed to have different diameters from one another, the external force can be distributed in proportion to the diameters of the external cylinders.

Further, the sum of the diameters of the external cylinders 420*a*, 420*b*, 420*c*, 420*d*, 420*e*, 420*f*, and 420*g* constituting the hydraulic jack 400*a* is designed to be smaller than the diameter of the internal cylinder 411, more particularly to be equal to or less than ⅓ of the diameter of the internal cylinder 411. If the diameter of the external cylinder is larger than that of the internal cylinder 411, a force smaller than the size of the external force applied to the external cylinders may be transferred to the internal cylinder 411.

Now, an explanation of an operating principle of the hydraulic jack 400*a* according to another embodiment of the present invention will be given in detail with reference to FIG. 18.

As shown in FIG. 18, the hydraulic jack 400*a* according to another embodiment of the present invention is provided with three external cylinders 420*a*, 420*b*, and 420*c*. FIG. 18 is a sectional view showing operating principle of the hydraulic jack 400*a* of FIG. 16, and even in the case where two external cylinders or four or more external cylinders are provided, accordingly, the operating principle of the hydraulic jack 400*a* may be similar to or the same as the operating principle as will be discussed below.

If the pressurizing lever 430 is lifted up in a state where the hydraulic jack 400*a* comes into contact with the object to be lifted up under the object, the pressurizing pistons 421*a*, 421*b*, and 421*c* of the respective external cylinders 420*a*, 420*b*, and 420*c* are moved up to produce negative pressures to the external cylinders 420. Accordingly, the operating fluid stored between the body 410 and the internal cylinder 411 is introduced into the external cylinders 420*a*, 420*b*, and 420*c* along suction pipes 451, 451*b*, and 451*c*.

After that, if the pressurizing lever 430 is pressed by the user, the pressurizing pistons 421*a*, 421*b*, and 421*c* are moved down to apply a pressure to the operating fluid sucked to the external cylinders 420*a*, 420*b*, and 420*c*. Accordingly, the operating fluid sucked to the external cylinders 420*a*, 420*b*, and 420*c* is moved to the internal cylinder 411 along supply pipes 452*a*, 452*b*, and 452*c*. Next, the lifting piston 412 is moved up by means of the pressure of the operating fluid introduced into the internal cylinder 411. The above-mentioned processes are repeatedly carried out as the pressurizing lever 430 is moved up and down by the user, and accordingly, the pressure of the internal cylinder 411 is gradually increased to allow the lifting piston 412 to be gradually moved up, thereby lifting up the object placed on top of the lifting piston 412.

In this case, the hydraulic jack 400*a* according to another embodiment of the present invention further includes shutoff valves 4511*a*, 4511*b*, and 4511*c* located on one end of the suction pipes 451, 451*b*, and 451*c* and control means (not shown) for controlling the opening and closing of the shutoff valves 4511*a*, 4511*b*, and 4511*c*.

The control means is provided in the form of a control circuit located inside the fastening bracket 415 in such a manner as to be electrically connected to the shutoff valves 4511*a*, 4511*b*, and 4511*c*. In this case, the control means can open and close the shutoff valves 4511*a*, 4511*b*, and 4511*c* according to the user's control.

$$W = \frac{D^2}{d^2} w \quad \text{[Mathematical Expression 1]}$$

Mathematical expression 1 indicates a force W applied to the lifting piston 412, and the lifting force W applied to the lifting piston 412 is determined according to the ratio of the sum of the diameters d of the pressurizing pistons 421*a*, 421*b*, and 421*c* to the diameter D of the lifting piston 412 and the external force w applied to the pressurizing pistons 421*a*, 421*b*, and 421*c*.

If the external force w of a given size is transferred to the hydraulic jack 400*a* through the pressurizing lever 430 by the user, that is, the lifting force W applied to the lifting piston 412 can be varied according to the ratio of the sum of the diameters d of the pressurizing pistons 421*a*, 421*b*, and 421*c* to the diameter D of the lifting piston 412. In this case, the diameter D of the lifting piston 412 is determined according to the diameter of the internal cylinder 411, and the sum of the diameters d of the pressurizing pistons 421*a*, 421*b*, and 421*c* is determined according to the sum of the diameters of the external cylinders 420*a*, 420*b*, and 420*c*. Accordingly, the lifting force W applied to the lifting piston 412 can be varied according to the ratio of the sum of the diameters of the external cylinders 420*a*, 420*b*, and 420*c* to the diameter of the internal cylinder 411.

Accordingly, the hydraulic jack 400*a* according to another embodiment of the present invention is configured to allow the shutoff valves 4511*a*, 4511*b*, and 4511*c* to be selectively open and closed by means of the control means, thereby adjusting the amount of operating fluid introduced into the external cylinders 420*a*, 420*b*, and 420*c*, and configured to allow the pressure to be applied to the operating fluid only through the pressurizing pistons 421*a*, 421*b*, and 421*c* whose shutoff valves 4511*a*, 4511*b*, and 4511*c* are open, thereby adjusting the lifting force of the lifting piston 412.

For example, if only the first shutoff valve 4511*a* is closed by the control of the control means, the external force applied to the operating fluid is transferred by ⅔ of the external force w applied to the operating fluid when all of the shutoff valves 4511*a*, 4511*b*, and 4511*c* are open. That is, the diameters of the external cylinders 420*a*, 420*b*, and 420*c* are varied according to the control of the control means, thereby ensuring the adjustment in the lifting force W of the lifting piston 412, and further, the lifting height of the hydraulic jack 400*a* according to a single operation of the pressurizing lever 430 is regulated according to the kind of object to be lifted up and the kind of work to be carried out after the object has been lifted up.

According to other embodiments of the present invention, the control means may automatically determine the shutoff valves 4511*a*, 4511*b*, and 4511*c* to be open and closed.

For example, the control means opens only one of the shutoff valves 4511*a*, 4511*b*, and 4511*c* until the pressurizing lever 430 operates by predetermined times from an initial operating time point of the hydraulic jack 400*a*, and from the time point where the pressurizing lever 430 operates over the predetermined times, next, the control means opens all of the shutoff valves 4511*a*, 4511*b*, and 4511*c*. In specific, the control means opens the first shutoff valve 4511*a* until the pressurizing lever 430 initially operates five times, opens the first shutoff valve 4511*a* and the second shutoff valve 4511*b* until the pressurizing lever 430 operates six to ten times, and opens all of the shutoff valves 4511*a*, 4511*b*, and 4511*c* until the pressurizing lever 430 operates over 11 times. In the case of lifting up the object through the hydraulic jack 400*a*, generally, the kinds of works carried out at a relatively low height are rare, and accordingly, after the object is lifted up at a fast speed at an initial step, if the object reaches an appropriate height, the lifting height of the object has to be finely adjusted. According to the above-mentioned characteristics of the present invention, in this case, the object is lifted up at a fast speed with a relatively short time in a state where only a single shutoff valve is open, and as time is passed, the number of shutoff valves to be open increases to allow the lifting speed of the object to become gradually reduced. Accordingly, even if the hydraulic jack 400*a* is controlled by the user with the application of a constant force, the lifting height of the object can be varied.

For another example, the control means may automatically determine the shutoff valves 4511*a*, 4511*b*, and 4511*c* to be open and closed according to the weight of the object located on top of the hydraulic jack 400*a*.

To do this, the hydraulic jack 400*a* according to other embodiments of the present invention further includes a weight sensing means (not shown).

The weight sensing means serves to sense the weight of the object located on top of the hydraulic jack 400*a* and transmits the sensed weight to the control means, and the control means compares the sensed weight with predetermined threshold sections and thus determines the opening and closing of the shutoff valves 4511*a*, 4511*b*, and 4511*c* according to the compared result.

For example, if it is checked by the control means that the weight of the object is included in a first threshold section in which a relatively lightweight object is contained, all of the shutoff valves 4511*a*, 4511*b*, and 4511*c* are open to allow the lifting height of the hydraulic jack 400*a* according to a single operation of the pressurizing lever 430 to be relatively increased. Contrarily, if it is checked by the control means that the weight of the object is included in a second threshold section in which a relatively heavyweight object is contained, at least one of the shutoff valves 4511*a*, 4511*b*, and 4511*c* is open to allow the lifting height of the hydraulic jack 400*a* according to a single operation of the pressurizing lever 430 to be relatively decreased. This is because the object may escape from the hydraulic jack 400*a* while being lifted up in the case where the object is relatively lightweight and because there is a rare possibility that the object may escape from the hydraulic jack 400*a* while being lifted up but there is a need to apply a substantially strong lifting force in the case where the object is relatively heavyweight.

Like this, the hydraulic jack 400*a* according to another embodiment of the present invention is configured to vary the lifting force of the lifting piston 412 according to the kind of object or the kind of work to be carried out, thereby achieving the corresponding work efficiently.

Figure 19:
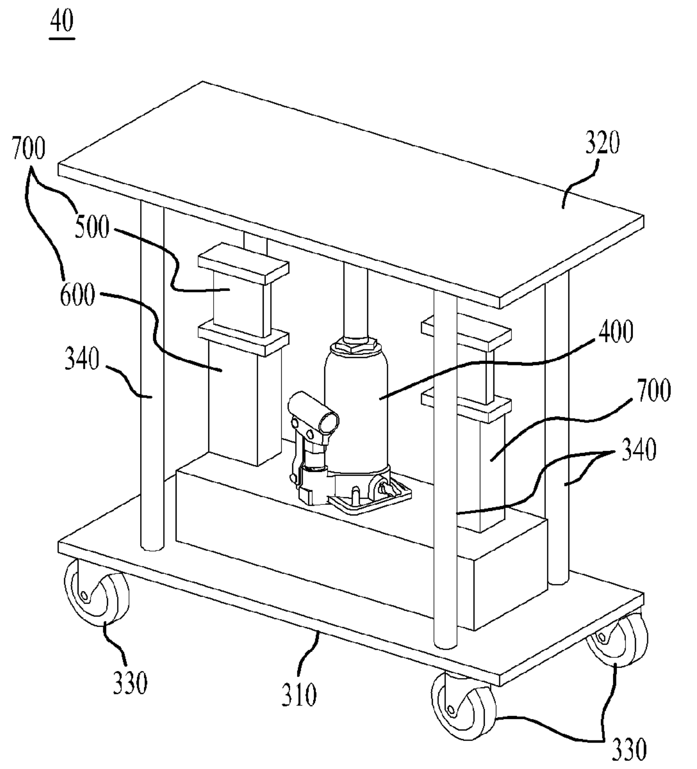
FIG. 19 is a perspective view showing a movable lifting device having a hydraulic jack according to yet another embodiment of the present invention.

FIG. 19 is a perspective view showing a movable lifting device having a hydraulic jack according to yet another embodiment of the present invention.

In specific, a movable lifting device 40 having a hydraulic jack according to yet another embodiment of the present invention includes a lower frame 310, an upper frame 320, a hydraulic jack 400, and fall prevention parts 700.

In this case, the lower frame 310, then upper frame 320 and the hydraulic jack 400 constituting the movable lifting device 40 according to yet another embodiment of the present invention, which are shown in FIG. 19, are the same as the lower frame 310, the upper frame 320, and the hydraulic jack 400 constituting the movable lifting device 20 according to one embodiment of the present invention, which are shown in FIG. 11, and a repeated explanation will be avoided below.

The fall prevention parts 700 are located on both sides of the hydraulic jack 400, and if the upper frame 320 falls, the fall prevention parts 700 support the upper frame 320 falling to prevent the hydraulic jack 400 from being broken.

According to an embodiment of the present invention, each fall prevention part 700 includes an elastic support 500 and a load distributor 600.

In this case, the elastic support 500 has the same configuration as the elastic support 500 as shown in FIG. 6 except the difference in size, and accordingly, an explanation of the elastic support 500 of each fall prevention part 700 will be avoided.

Figure 20:
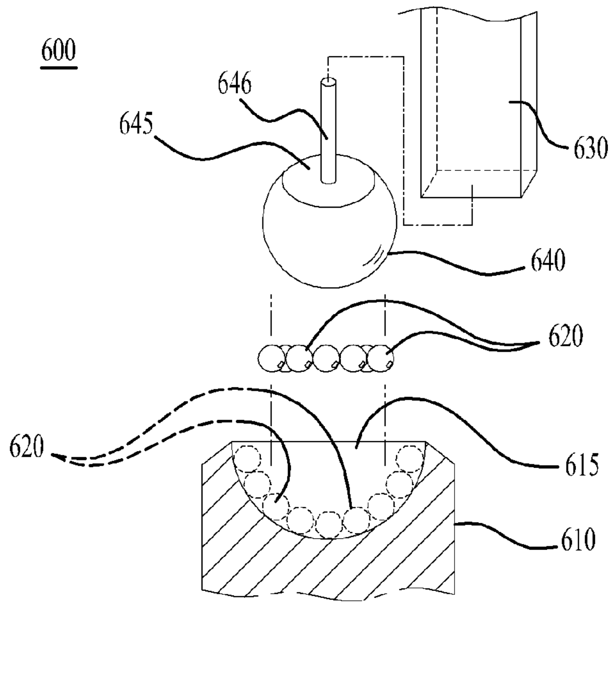
FIG. 20 is a side view showing a load distributor of FIG. 19.

Referring to FIG. 20, the load distributor 600 includes a ball housing 610 located on the underside of a support 630 supporting the underside of the elastic support 500 and having a hollow portion 615 formed at the inside thereof, a plurality of small support balls 620 seated into the hollow portion 615, and a ground ball 640 having a ground plane 645 formed on top thereof and a fixing bolt 646 extended upwardly from the center of the ground plane 645.

The load distributor 600 serves to distribute the load applied from the outside, to absorb some of the load, and transfers the load q smaller than the load P applied from the outside.

The load distributor 600 distributes the load applied from the outside to the interior of the ball housing 610 and allows the ball housing 610 to finally transfer the load smaller than the load applied from the outside. The load applied from the outside of the ball housing 610 is distributed by the plurality of small support balls 620 located in the hollow portion 615 and the ground ball 640. In this case, some of the load is pressurizedly distributed against the inner peripheral wall of the ball housing 610, and the rest of the load is transferred to the outside of the ball housing 610.

The ball housing 610 is fixedly located to a given surface by means of concrete and the like and has the hollow portion 615 formed at the inside thereof to accommodate the plurality of small support balls 620 and the ground ball 640 therein.

The ball housing 610 is made of a material having a given strength, such as iron, concrete, wood, plastic, and the like to support the load distributed by the operations between the plurality of small support balls 620 and the ground ball 640 located therein.

The ball housing 610 is formed to various shapes such as polygon, sphere, and the like, but the hollow portion 615 has the shape of a sphere corresponding to the shape of the ground ball 640.

The plurality of small support balls 620 and the ground ball 640 are accommodated in the hollow portion 615 and are formed to spherical shapes.

The plurality of small support balls 620 are regularly arranged along the outer peripheral surface of the hollow portion 615 in such a manner as to come into contact with one another, and through the contact points between the plurality of small support balls 620 and the ground ball 640, the external load is transferred and finally pressurized against the hollow portion 615 located at the outermost position, that is, the inner peripheral wall of the ball housing 610, so that the external load is distributed. According to the present invention, in this case, the plurality of small support balls 620 are regularly arranged, and the ground ball 640 is placed on tops of the plurality of small support balls 620, so that the number of contact points between the plurality of small support balls 620 and the ground ball 640 is increased and the load transfer is regularly performed, thereby enhancing the load transfer efficiency therebetween. Moreover, the ground ball 640 is supported against the plurality of small support balls 620 through point-contacts, thereby being minimized in wearing.

The plurality of small support balls 620 and the ground ball 640 are made of a material having a strength resistant to the load generated through the contact points therebetween, such as iron, concrete, wood, plastic, and the like.

Further, the ground ball 640 has the ground plane 645 formed on top thereof. The fixing bolt 646 is located at the center of the ground plate 645 in such a manner as to be inserted into the lower side of the support 630 to allow the support 630 to be fixed to the ground ball 640.

In this case, the fixing bolt 646 may be plane on the outer peripheral surface thereof, without any separate protrusion therefrom, but desirably, the fixing bolt 646 has a screw thread (that is, the shape of a screw) formed on the outer peripheral surface thereof, so that the fixing bolt 646 is more strongly fastened to the lower side of the support 630.

Like this, the load distributors 600 are located on the undersides of the elastic supports 500 to support the elastic supports 500 thereagainst, thereby ensuring the stability in supporting the upper frame 320 through the elastic supports 500.

Further, a fitting frame having improved prefabricated rails according to still another embodiment of the present invention may include a structure repairing composition with an acryl binder adapted to be filled in a crack occurring in a building structure to repair the building structure.

In this case, the structure may include the frame bodies 100, the rail coupling bodies 200, and the movable lifting devices 20, 30, and 40 each having the hydraulic jack, and without being limited thereto, the structure may include the components according to the embodiments of the present invention.

The inventors have found that no composition capable of expressing perfect performance exists in conventional structure repairing compositions whose water resistant, waterproof, and crack resistant properties have been improved, and accordingly, they have studied to propose a composition capable of providing excellent water resistant, waterproof, and crack resistant performance.

According to the present invention, the acryl binder may be an acrylic ester copolymer. The acrylic ester copolymer may have CAS Number 30445-28-4. After the inventors have discovered various compounds capable of being added to the structure repairing composition, they have checked that if the structure repairing composition contains the acrylic ester copolymer, it can have perfect water resistant, waterproof, and crack resistant performance.

According to the present invention, the structure repairing composition includes preferably 10 to 50 parts by weight, more preferably 15 to 40 parts by weight, most preferably 20 to 30 parts by weight of acryl binder.

To improve various properties, particularly water resistant and waterproof properties, which are provided by the composition according to the present invention, further, the structure repairing composition includes ethylene vinyl acetate (EVA) binder, butyl cellosolve, rosin, texanol, and propylene glycol.

According to the present invention, EVA binder is a compound having CAS Number 24937-78-8.

According to the present invention, butyl cellosolve is a compound having CAS Number 111-76-2.

According to the present invention, rosin is a natural resin obtained by distilling a liquid resin, and all of the commercial rosin products for sales may be included in the present invention, irrespective of their kind.

According to the present invention, texanol is a compound having CAS Number 25265-77-4.

According to the present invention, propylene glycol is a compound having CAS Number 57-55-6.

The inventors have checked that if the structure repairing composition containing acryl binder further includes EVA binder, butyl cellosolve, rosin, texanol, and propylene glycol, the structure repairing composition has excellent waterproof properties.

In specific, the composition includes 0.01 to 10 parts by weight of EVA binder, 0.01 to 5 parts by weight of butyl cellosolve, 0.01 to 5 parts by weight of rosin, 0.01 to 5 parts by weight of texanol, and 0.01 to 3 parts by weight of propylene glycol.

In more specific, the inventors have checked that if the composition further includes 2-amino-2-methyl-1-propanol and 2-methylamino-2-methyl-1-propanol, it has more excellent waterproof properties. That is, if the structure repairing composition containing acryl binder further includes EVA binder, butyl cellosolve, rosin, texanol, propylene glycol, 2-amino-2-methyl-1-propanol, and 2-methylamino-2-methyl-1-propanol, it has more excellent water resistant and waterproof performance.

According to the present invention, the composition includes 2-amino-2-methyl-1-propanol and 2-methylamino-2-methyl-1-propanol preferably in the ratio of 15 to 20 to 1, more preferably in the ratio of 16 to 20 to 1, most preferably in the ratio of 17 to 20 to 1.

The composition includes 0.1 to 5 parts by weight of 2-amino-2-methyl-1-propanol and 2-methylamino-2-methyl-1-propanol.

The inventors have checked that various properties, particularly waterproof properties, which are provided by the composition according to the present invention, can be improved.

According to another embodiment of the present invention, the structure repairing composition containing acryl binder may include ethylene glycol, butyl cellosolve, calcium carbonate, titanium dioxide, and water.

If the above-mentioned composition has excellent water resistant and waterproof performance, the structure repairing composition containing acryl binder according to another embodiment of the present invention may have excellent crack resistant performance. The butyl cellosolve is the same as mentioned above.

According to the present invention, ethylene glycol is a compound having CAS Number 107-21-1.

According to the present invention, calcium carbonate is a compound having CAS Number 1317-65-3.

According to the present invention, titanium dioxide is a compound having CAS Number 13463-67-7.

In specific, the composition includes 0.01 to 5 parts by weight of ethylene glycol, 0.01 to 5 parts by weight of butyl cellosolve, 20 to 50 parts by weight of calcium carbonate, 0.01 to 5 parts by weight of titanium dioxide, and 0.01 to 10 parts by weight of water.

While the inventors are discovering the components for improving the crack resistance of the composition, they have found that natural extracts are proper in improving the crack resistance. Accordingly, they have checked that if the composition includes the mucus of flax seeds or the extract of the mucus, it has excellent crack resistance. That is, if the structure repairing composition containing acryl binder further includes ethylene glycol, butyl cellosolve, calcium carbonate, titanium dioxide, water, and the mucus of flax seeds or the extract of the mucus, it has more excellent crack resistance.

According to the present invention, flax is an annual plant with flat and elongated oval seeds having yellowish brown colors, in the family Linaceae of Geraniales of dicotyledonous plants.

According to the present invention, the mucus of flax seeds can be produced through various methods. For example, the mucus of flax seeds is produced by using a scraper.

According to the present invention, the extract of the mucus of flax seeds can be produced by using the following method.

First, 1 g of flax seeds is put in 50 L of distilled water, and after a mixture of the flax seeds and the distilled water is agitated at a temperature of 25° C. for 5 hours, it is filtered by a 300 mesh filter cloth. Next, alcohol, preferably ethanol of the same quantity as the filtered liquid is added to the filtered liquid and is segmented therein, and after the segmentation, the liquid is filtered by Whatman filter paper, for example, Whatman filter paper No. 5 and is then dried, thereby obtaining the extract to the form of white powder.

In conventional practices, flax seeds are used in various fields, but up to now, there are no proposals or studies in which the flax seeds are contained in the structure repairing composition to improve crack resistance, as suggested in the present invention.

In specific, the composition includes 1 to 10 parts by weight of the mucus of flax seeds or the extract of the mucus.

Further, the structure repairing composition includes one or more additives selected from the group consisting of a dispersing agent, an antifoaming agent, an antimicrobial agent, a preservative agent, and an antifreezing agent within a range where the basic physical properties of the structure repairing composition are not inhibited.

According to the present invention, further, a method for repairing a crack of the structure includes the step of: removing a deteriorated portion on the surface of the structure (Step 1); and applying the structure repairing composition to top of the surface of the structure from which the deteriorated portion is removed and drying the applied composition to thus form a crack repair film.

Hereinafter, the explanation of the constitution and effectiveness of the present invention will be given in detail through products made according to embodiments of the present invention and a comparative product with the products. However, the embodiments of the present invention are just described to explain the present invention in detail, and accordingly, they do not limit the scope of the present invention.

Preparation of Materials

Information of the main materials used for the structure repairing compositions according to the following Embodiments and Estimation example is as follows.

1) Acryl binder: acrylic ester copolymer having CAS No. 30445-28-4
2) EVA binder: ethylene vinyl acetate having CAS No. 24937-78-8
3) Butyl cellosolve: CAS No. 111-76-2
4) Texanol: CAS No. 25265-77-4
5) Propylene glycol: CAS No. 57-55-6
6) Ethylene glycol: CAS No. 107-21-1
7) Calcium carbonate: CAS No. 1317-65-3
8) Titanium dioxide: CAS No. 13463-67-7
9) 2-amino-2-methyl-1-propanol: CAS No. 124-68-5
10) 2-methylamino-2-methyl-1-propanol: CAS No. 27646-80-6
11) The mucus of flax seeds: scraped from the flax seed through a scraper
12) The extract of the mucus of flax seeds:

First, 1 g of flax seeds was put in 50 L of distilled water, and after a mixture of the flax seeds and the distilled water was agitated at a temperature of 25° C. for 5 hours, it was filtered by a 300 mesh filter cloth. Next, ethanol of the same quantity as the filtered liquid was added to the filtered liquid and was segmented therein, and after the segmentation, the liquid was filtered by Whatman filter paper No. 5 and was then dried to obtain about 0.2 g of white powder.

Embodiment 1

First, 30 parts by weight of acryl binder was put into an agitation vessel and agitated at a speed of 600 rpm, while slowly adding 5 parts by weight of EVA binder, 1 parts by weight of butyl cellosolve, 0.5 parts by weight of rosin, 0.5 parts by weight of texanol, 0.1 parts by weight of propylene glycol, other thickening agents, and a pH-regulating agent in the order mentioned thereto. Next, 50 parts by weight of calcium carbonate as a filler was put in the agitated mixture and agitated to a speed of 300 rpm at a room temperature for one hour, thereby making a structure repairing composition.

Embodiment 2

First, 30 parts by weight of acryl binder was put into an agitation vessel and agitated at a speed of 600 rpm, while slowly adding 5 parts by weight of EVA binder, 1 parts by weight of butyl cellosolve, 0.5 parts by weight of rosin, 0.5 parts by weight of texanol, 0.1 parts by weight of propylene glycol, 1 parts by weight of 2-amino-2-methyl-1-propanol, 0.06 parts by weight of 2-methylamino-2-methyl-1-propanol, other thickening agents, and a pH-regulating agent in the order mentioned thereto. Next, 50 parts by weight of calcium carbonate as a filler was put in the agitated mixture and agitated to a speed of 300 rpm at a room temperature for one hour, thereby making a structure repairing composition.

Embodiment 3

First, 30 parts by weight of acryl binder was put into an agitation vessel and agitated at a speed of 600 rpm, while slowly adding 1 parts by weight of ethylene glycol, 1 parts by weight of butyl cellosolve, 0.5 parts by weight of titanium dioxide, 5 parts by weight of water, other thickening agents, and a pH-regulating agent in the order mentioned thereto. Next, 50 parts by weight of calcium carbonate as a filler was put in the agitated mixture and agitated to a speed of 300 rpm at a room temperature for one hour, thereby making a structure repairing composition.

Embodiment 4

First, 30 parts by weight of acryl binder was put into an agitation vessel and agitated at a speed of 600 rpm, while slowly adding 1 parts by weight of ethylene glycol, 1 parts by weight of butyl cellosolve, 0.5 parts by weight of titanium dioxide, 5 parts by weight of water, 5 parts by weight of a mixture between the mucus of flax seeds and the extract of the mucus, other thickening agents, and a pH-regulating agent in the order mentioned thereto. Next, 50 parts by weight of calcium carbonate as a filler was put in the agitated mixture and agitated to a speed of 300 rpm at a room temperature for one hour, thereby making a structure repairing composition.

Estimation Example 1

After a deteriorated portion was removed from the surface of a structure, the structure repairing compositions according to Embodiments 1 to 4 were applied to top of the surface of the structure and then dried to form crack repair films. The bond strengths, crack resistances, and skid resistances of the crack repair films and the storage stability of the structure repairing compositions were tested according to test methods in KSL 1593 of Korean standards (KS), and the test results are suggested in Table 1. In the case of waterproof properties, further, degrees of absorption of the structure repairing compositions to the interior of the surface of the structure after the crack repair films are formed were estimated on a five-point Likert scale. In Table 1, a product X is a structure repairing product that is made by a company B in Korea and is on sale, and the product X was estimated as a comparison composition with the compositions according to Embodiments 1 to 4.

TABLE 1

| Embodiment | Bond Strength ($kgf/cm^2$) Standard | Under water | Waterproof Properties | Crack Resistance | Skid Resistance |
|---|---|---|---|---|---|
| 1 | 12 | 8 | 4.6 | 55 times | No problem |
| 2 | 14 | 10 | 4.8 | 60 times | No problem |
| 3 | 11 | 7 | 4.2 | 60 times | No problem |
| 4 | 12 | 8 | 4.4 | 65 times | No problem |
| Product X | 11 | 5 | 3.9 | 45 times | No problem |

As appreciated from Table 1, it can be checked that when the structure repairing compositions according to Embodiments 1 to 4 are compared with the product X, they have the water resistance, waterproof properties, and crack resistance more improved than the product X, and further, they do not have any problem in the storage stability and skid resistance. In specific, it can be appreciated that the structure repairing compositions according to Embodiments 1 and 2 have excellent waterproof properties and water resistance and the structure repairing compositions according to Embodiments 3 and 4 have excellent crack resistance.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. For example, the parts expressed in a singular form may be dispersedly provided, and in the same manner as above, the parts dispersed may be combined with each other.

The scope to be protected through the present invention is defined not by the detailed description but by the claims as will be discussed later, and changes and modifications may occur to those skilled in the art upon reading the specification. The present application includes such changes and modifications and is limited only by the scope of the claims.

The invention claimed is:

1. A fitting frame having improved prefabricated rails, comprising:

an upper frame body and a lower frame body located under and above door frames to have surfaces facing each other and molded through extrusion in a longitudinal direction thereof; and rail coupling bodies fastened to the facing surfaces of the upper frame body and the lower frame body in such a manner as to seat the door frames thereinto and to thus slidingly guide the door frames, wherein the upper frame body and the lower frame body have rail insertion recesses formed on the surfaces facing each other in such a manner as to fastenedly insert the rail coupling bodies thereinto, each rail coupling body comprising: a rail body having the shape corresponding to the shape of each rail insertion recess; a bump having the shape corresponding to a outer peripheral surface of a roller of each door frame in such a manner as to be extended from a top of the rail body in a longitudinal direction of the rail body, the rail body having a height greater than a depth of each rail insertion recess so that the roller can be seated onto the top of the rail body; and a fastening support body extended from an underside of the rail body in such a manner as to be fastenedly inserted into each rail insertion recess in such a manner as to support the rail body by means of elastic forces, the fastening support body comprising: a first wall extended downwardly from one side of the underside of the rail body; a second wall extended downwardly from the other side of the underside of the rail body in such a manner as to be spaced apart from the first wall; thermal insulators located at spaces between support bodies formed on facing surfaces of the first wall and the second wall; fastening protrusions formed on outer surfaces of the first wall and the second wall in such a manner as to become gradually reduced in width toward the first wall and the second wall and to be thus fastenable to fastening grooves formed on the rail insertion recesses; elastic supports located on undersides of the first wall and the second wall; and a third wall located spaced apart from the first wall and the second wall under the first wall and the second wall by means of the elastic supports in such a manner as to be seated onto the bottom of the rail insertion recess to support the first wall and the second wall thereagainst, each elastic support comprising: a base frame for supporting the first wall or the second wall; four base plates for supporting the base frame seated onto tops of the plates; four pairs of support frames having first support frames and second support frames rotatably connected to each other on undersides of the four base plates; and a support post having the shape of a rectangular post and configured to allow the first frames to be connected to a top thereof in such a manner as to rotatably move the first frames slidingly in a horizontal direction and to allow the second frames to be connected to sides thereof in such a manner as to rotatably move the second frames slidingly in a vertical direction, the support post comprising: a post body having the shape of a rectangular post; a cross groove concavely formed to the shape of "+" on a top of the post body; a cross elastic member having the shape corresponding to the cross groove in such a manner as to be inserted into the cross groove and configured to allow undersides of the first frames to be rotatably connected to tops of four branch ends thereof; four vertical grooves formed vertically on the respective sides of the post body; and four vertical elastic members having the shapes corresponding to the vertical grooves in such a manner as to be inserted into the vertical grooves and configured to allow undersides of the second frames to be rotatably connected to outsides of tops thereof; the cross elastic member comprising: a cross case having a "+"-shaped empty internal space; a top support having the shape of a regular hexahedron in such a manner as to be located at the center of the cross case; four top elastic materials located on respective side surfaces of the top support; four top elastic supports located on ends of respective branches of the internal space of the cross case in such a manner as to be supported by elastic forces of the top elastic materials; and four top connection links located on the ends of respective branches of the cross groove in such a manner as to be kept at a given gap from the cross case by means of support bars located between one side surface facing the cross case and the top elastic supports, to allow undersides of the first frames to be rotatably connected to tops thereof, and to slidingly move along the cross groove in a direction of a center at which the respective branches of the cross groove meet, each vertical elastic member comprising: a vertical case having an empty internal space corresponding to the vertical groove; a side support having the shape of a regular hexahedron in such a manner as to be located at a lower space of the vertical case; a side elastic material located on top of the side support; a side elastic support located on top of the internal space of the vertical case in such a manner as to be supported by the elastic force of the side elastic material; and a side connection link located on an upper end of the vertical groove in such a manner as to be kept at a given gap from the vertical case by means of a support bar located between one side surface facing the vertical case and the side elastic support, to allow a lower side of the second frame to be rotatably connected to the outer surfaces thereof, and to slidingly move along the vertical groove in a downward direction of the vertical groove.

* * * * *